United States Patent
Patiejunas

(10) Patent No.: US 7,748,004 B2
(45) Date of Patent: *Jun. 29, 2010

(54) SYSTEM AND METHOD FOR IMPLEMENTING A CLIENT SIDE HTTP STACK

(75) Inventor: Kestutis Patiejunas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

This patent is subject to a terminal disclaimer.

(21) Appl. No.: 11/624,957

(22) Filed: Jan. 19, 2007

(65) Prior Publication Data

US 2007/0118596 A1 May 24, 2007

Related U.S. Application Data

(63) Continuation of application No. 09/730,190, filed on Dec. 5, 2000, now Pat. No. 7,219,346.

(51) Int. Cl.
*G06F 9/46* (2006.01)
(52) U.S. Cl. .................. 718/102; 709/223; 709/202
(58) Field of Classification Search .................. 718/102; 709/223, 202
See application file for complete search history.

(56) References Cited

U.S. PATENT DOCUMENTS

| | | | |
|---|---|---|---|
| 5,752,031 A | 5/1998 | Cutler et al. | |
| 5,754,771 A | 5/1998 | Epperson et al. | |
| 5,796,954 A | 8/1998 | Hanif et al. | |
| 5,913,215 A | 6/1999 | Rubinstein et al. | |
| 6,003,061 A | 12/1999 | Jones et al. | |
| 6,324,492 B1 | 11/2001 | Rowe | |
| 6,493,749 B2 | 12/2002 | Paxhia et al. | |
| 6,687,729 B1 | 2/2004 | Sievert et al. | |
| 6,725,253 B1 | 4/2004 | Okano et al. | |
| 6,957,435 B2 | 10/2005 | Armstrong et al. | |
| 6,976,095 B1 | 12/2005 | Wolrich et al. | |
| 7,051,330 B1 | 5/2006 | Kaler et al. | |

OTHER PUBLICATIONS

International Search Report mailed Sep. 20, 2004, dated Feb. 27, 2004, for European Patent Application Serial No. 01124445, 6 pages.
Control of Dynamic Threads Pool for Concurrent Remote Procedure Calls, IBM Technical Disclosure Bulletin, IBM Corp., (May 1, 1995) vol. 38, No. 5, New York.
Brown, et al. "DeckScape: An Experimental Web Browser, Computer Networks and ISDN Systems" (Apr. 1, 1995) vol. 27, No. 6, North Holland Publishing, Amsterdam, NL.

*Primary Examiner*—Meng-Ai An
*Assistant Examiner*—Gregory A Kessler
(74) *Attorney, Agent, or Firm*—Workman Nydegger

(57) ABSTRACT

A software components and methods are provided for implementation of a client side HTTP stack, which provide high performance and scalability. Multithreading and completion ports are employed in the client side HTTP layer in association with sockets and a thread pool, thereby providing support for business-to-business and other more recent client side applications which create numerous requests. The invention further comprises a dedicated scheduler thread adapted to activate an object scheduled to begin sending requests at a specific time, as well as a dedicated DNS thread used for resolving symbolic domain names into IP addresses. In addition, the client side HTTP stack implementation comprises a dedicated timeout thread with a list of active sockets and timers associated with each socket to allow finer grain control over socket timeout.

20 Claims, 11 Drawing Sheets

SYSTEM AND METHOD FOR IMPLEMENTING A CLIENT SIDE HTTP STACK

CROSS REFERENCE

This application is a continuation of U.S. application Ser. No. 09/730,190, filed Dec. 5, 2000, entitled SYSTEM AND METHOD FOR IMPLEMENTING A CLIENT SIDE HTTP STACK, which is hereby incorporated by reference as if fully set forth herein.

TECHNICAL FIELD

The present invention relates generally to computer systems, and more particularly to methods and systems for implementing a client side HTTP stack in a computer system.

BACKGROUND

The rapid growth of the Internet and Internet based applications has created a multitude of benefits for individuals, businesses, governments, schools, and society in general. Several years ago the Internet was primarily used by individuals to 'surf the web' using a web browser software application component. In this situation, the individual's computer is sometimes referred to as a client. The client requests data, images, or other information from another machine, sometimes referred to as a server, via the Internet. This client/server architecture may be thought of in terms of a requesting machine (e.g., the client) and a supplying machine (e.g., the server), which may include a database and a database management system (DBMS) software application. The client web browser gains access to the Internet through a network communications protocol, which includes one or more layers, in order to request and obtain information from the server database software.

The browser typically interfaces with a hypertext transport protocol (HTTP) software component, which provides for sending requests and receiving responses in a first layer. The HTTP software component is sometimes referred to as the HTTP stack. The HTTP stack protocol is used to establish a connection with a web server and to transmit hypertext markup language (html) pages or other data to the client browser. To do this, the HTTP stack interfaces with a transport layer, such as the transmission control protocol (TCP). The TCP layer interfaces with a network layer software component, such as the Internet protocol (IP) layer. The TCP/IP communications protocol has become the standard for most Internet communication, wherein the TCP layer or stack provides transport functions to ensure the total amount of bytes in a transmitted data packet are properly received, and the IP layer provides a routing mechanism. In the IP protocol, messages include addresses for both the destination station or machine, and the destination network (e.g., an IP address), thus rendering the IP protocol particularly applicable to the Internet.

On the server machine, the server software application (e.g., a database management system software component) receives requests from one or more such clients via a layered network architecture including a server side IP layer, a server TCP layer, and a server side HTTP stack. In the past, significant attention was focused on improving the throughput capability of server side software implementations of the HTTP layer (e.g., the server side HTTP stack), such as by the employment of multi-tasking techniques. This is because such servers are commonly subjected to hundreds and even thousands of client requests within a short period of time.

Thus, many server side HTTP stack software implementations provide for multithreading, which allows two or more streams of execution (threads) to run concurrently within a single program (e.g., to service multiple client requests). Multithreading may be employed in a single processor server machine, and/or in a multiprocessing environment wherein a plurality of processors may service individual threads. For example, individual client requests may be processed by corresponding threads, thereby increasing the request handling capacity of the server. In addition, some server side HTTP stack implementations include methods and software components for facilitating efficient usage of such threads, for example, completion ports and the like.

While improvements have heretofore been made in the server side HTTP stack implementation to support the large number of requests typically received by such servers, little attention has been thus far paid to the client side HTTP stack implementation. The typical web browser application on the client side is usually asked to obtain information from a server in relatively small chunks (e.g., one html page at a time). In addition, the web browser typically only generates a new request when the client user performs a user interface command, such as by selecting a new page to view. For example, a user may obtain a page of information, and study the page for several seconds or even minutes before initiating a request for another page. Consequently, there has thus far been no incentive to improve the request throughput capacity of client side HTTP stack implementations.

In recent years, however, advanced software applications have been developed and installed, which provide businesses and other institutions with Internet based features and capabilities requiring improved processing capabilities on the client machine. For instance, a client machine may include an application which generates hundreds or even thousands of requests in a very short period of time, which need to be processed in a timely fashion. Thus, there is a need for improved methods and systems for implementing a client side HTTP stack in a computer system.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The invention comprises a client side HTTP stack implementation which provides high performance and scalability not previously achieved, wherein multithreading and completion ports are employed in the client side HTTP layer in association with sockets and a thread pool. In the past, the client side HTTP stack has been implemented using one socket and one thread. While this provided usable processing capability for a single user accessing the Internet via a browser application, business-to-business and other more recent client side applications create numerous requests, which require timely processing. The single thread, single socket architecture, however, accommodates only one request at a time. Thus, in prior client side stack implementations, other requests may become starved due to the client processor being occupied processing one request at a time.

The invention allows client side applications to create completion ports with an associated concurrency value indicating the maximum number of threads associated with the port which should be running at any given time. I/O is associated with client side sockets, which in turn are associated with the completion port using a key. The use of completion ports and concurrency values improves processor utilization by allowing blocking threads to be deactivated, thereby suspending execution of tasks related to a given request, until the completion port receives an associated completion packet from the I/O. In operation, the threads that block on a completion port are deactivated, thereby allowing other threads to be activated as completion packets are received at the completion port within the concurrency limits.

In addition, the client side HTTP stack implementation provides for state machines associated with the requests. The state machines are associated with specific requests using one or more keys. When a client side completion port receives a completion packet from a server, the next available thread processes the request according to the corresponding state machine using the key. The state machine allows the correct processing of tasks associated with a particular request by any one of the threads from the thread pool, and thus facilitates the improved processing efficiencies achieved through the use of a thread pool and completion ports. In particular, the key facilitates the ability of a thread whose associated operation (e.g., an I/O operation) is pending, to check a completion port which may then activate the thread when any other operation is completed. When the initial (e.g., I/O) operation completes, the next available thread then resumes execution thereof at the appropriate state using the key. The thread thus returns to a pool of available or free threads once the thread receives an indication (e.g., status code) that the current operation is pending.

The invention further comprises a dedicated scheduler thread adapted to activate an object scheduled to begin sending requests at a specific time, as well as a dedicated DNS thread used for resolving symbolic domain names into IP addresses. In addition, the client side HTTP stack implementation comprises a dedicated timeout thread with a list of active sockets and timers associated with each socket to allow finer grain control over socket timeout periods.

An aspect of the present invention provides a client side HTTP stack software component for processing requests. The software component includes one or more completion port objects and a thread pool with a plurality of threads for processing tasks associated with client side requests. Whereas prior client side HTTP stack implementations comprise a single thread of execution, the invention provides multi-tasking request processing on the client system through the employment of a pool of threads shared between a plurality of active HTTP requests, which was heretofore not available.

In addition, the use of completion ports provides for efficient use of the thread pool, thereby further improving the throughput of client side request processing. One or more (e.g., several) nested and interrelated state machines may be associated with individual requests. When a thread processing a client request is going to perform a long lasting I/O operation (e.g., when a request message has been sent to a server and the thread is waiting for a response), the thread may determine from a status code that the operation is pending and discontinue the execution. The completion port may then activate the thread pending receipt of a completion packet associated with one or more the pending requests. Thus, once the thread is thus disassociated from the pending operation, the thread returns to the pool of available threads, from which it or other threads may be activated by the completion port to process another request. The selective activation of threads ensures that requests which may be further processed at a given time are provided with a thread for such processing, within the concurrency value associated with the completion port.

The state machines and the key associated with the request processes further facilitate the activation of threads using the completion port. For instance, when a first thread processing a task associated with a particular client request (e.g., an I/O operation) receives a status code indicating that the task is pending, the context of the first thread including the corresponding state machine state may be associated with a key, and the first thread returns to the thread pool. When the request processing is subsequently restarted (e.g., via the completion port activating a thread from the pool upon receipt of a completion packet), execution proceeds at the appropriate place (e.g., state machine state) according to the key associated with the request. The request may be restarted using the same or a different thread from the thread pool. For instance, the completion port may associate the context of the request with one of the threads in the pool using the key, in order to activate the thread based on an event, wherein the event may be the receipt of a completion packet.

In addition to the thread pool, completion ports, state machines, and keys, the client side HTTP stack component may comprise a scheduler thread adapted to activate an object scheduled to begin sending requests at a specific time, a DNS thread adapted to resolve domain names into IP addresses, and/or a timeout thread with a list of active sockets and timers associated with each socket, which is adapted to selectively timeout at least one socket according to a timer in the list.

According to another aspect of the invention, there is provided a software component for implementing a client side HTTP stack, comprising a thread pool. The thread pool may include N threads adapted to process M requests from a client application component, where N and M are integers greater than 1, and wherein M may be greater than N. For instance, ten such threads may be employed to process hundreds or even thousands of requests. The HTTP stack component may also comprise one or more thread activation components for selectively activating at least one of the N threads based on an event (e.g., receipt of a completion packet). In this regard, the thread activation component may comprise a completion port or any other software component adapted for such selective activation of threads of execution.

The threads in the thread pool are adapted to deactivate or otherwise disassociate themselves from processing an operation associated with a client request when the thread receives an indication (e.g., a status code) that the operation is pending. Thereafter, the thread returns to the thread pool to await activation by the completion port based on receipt of a completion packet. Thus, rather than waiting without performing any request processing tasks (e.g., blocking on an I/O operation), the thread may be advantageously employed to perform useful operations associated with a completion packet.

State machines may be associated with the M requests, and one or more keys may be associated with the requests. For example, each request may have a collection of several state machines associated with it, which are used when processing that particular request. Thus, where a first thread is associated with a first request, the thread may be adapted to associate its context with the corresponding state machine using a key, prior to returning to the thread pool. In addition, the thread activation component is adapted to associate the context of one of the N threads with the state machine using the key in order to activate the thread based on an event (e.g., receipt of a completion packet).

Yet another aspect of the invention provides a method of implementing a client side HTTP stack, which comprises processing M requests from a client application component using a thread pool comprising N threads, wherein M and N are integers greater than 1 and wherein M is greater than N. The method may further comprise selectively activating at least one of the N threads using one or more thread activation components (e.g., a completion port) based on an event (e.g., receipt of a completion packet). The threads may selectively deactivate and return to the thread pool, for example, when a thread receives an indication that the current operation with which it is associated is pending. In this manner, the threads do not block on I/O operations. Activating a thread based on an event may comprise receiving a completion packet using the thread activation component, and activating one of the N threads upon receipt of the completion packet.

Moreover, the method may comprise associating a state machine with at least one of the M requests. This may comprise associating at least one key with the at least one of the M requests, associating a first one of the N threads with the at least one of the M requests, and associating a context of the first one of the N threads with the at least one state machine using the at least one key when the first one of the N threads is deactivated or disassociated from the request (e.g., when an operation associated with the request is pending). In addition, the method may comprise associating a context of one of the N threads with the at least one state machine using the at least one key in order to activate the thread based on an event.

The method may further comprise activating an object scheduled to begin sending requests at a specific time using a scheduler thread and/or resolving domain names into IP addresses using a DNS thread. In addition, the method may include selectively timing out at least one socket according to at least one timer associated with the at least one socket using a timeout thread comprising a list of active sockets and timers associated with each socket.

Still another aspect of the invention provides a computer-readable medium having computer-executable instructions for processing M requests from a client application component using a thread pool comprising N threads, wherein M and N are integers greater than 1 and wherein M is greater than N. Further computer-executable instructions may be provided for selectively activating at least one of the N threads using at least one thread activation component based on an event.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
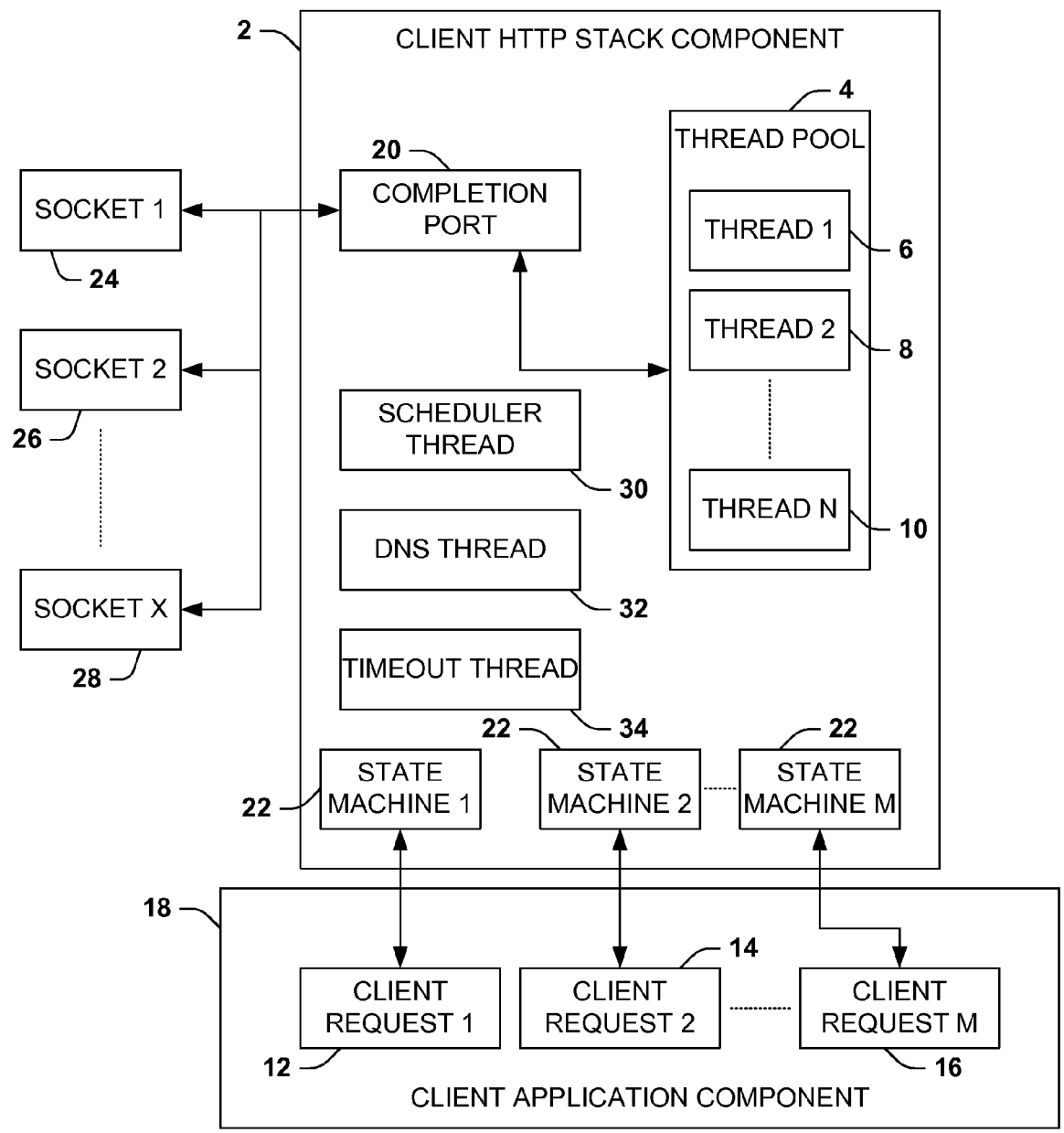
FIG. 1 is a schematic diagram illustrating an exemplary client side HTTP stack implementation according to an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

The invention comprises software components and methods for implementation of a client side HTTP stack, which provide high performance and scalability not achievable with conventional implementations. Multithreading and completion ports are employed in the client side HTTP layer in association with sockets and a thread pool, whereby business-to-business and other request intensive client side applications are supported. The invention further comprises a dedicated scheduler thread adapted to activate an object scheduled to begin sending requests at a specific time, as well as a dedicated DNS thread used for resolving symbolic domain names into IP addresses. In addition, the client side HTTP stack implementation comprises a dedicated timeout thread with a list of active sockets and timers associated with each socket to allow finer grain control over socket timeout periods.

In FIG. 1, an exemplary client side HTTP stack implementation component 2 is illustrated according to an aspect of the present invention. Component 2 comprises a thread pool 4 having N threads 6, 8, and 10, where N is an integer, for executing one or more of M client requests 12, 14, and 16, where M is an integer greater than N. The requests 12, 14, and 16 are generated by a client software application component 18. For example, the threads 6, 8, and 10 of the thread pool 4 may be scheduled for execution of a particular request (e.g., request 12, 14, or 16) according to a concurrency value (not shown) associated with a completion port 20, whereby the number of active threads may be controlled. Thus, where the concurrency value (e.g., 10) for the completion port 20 has not been reached, and one or more of the M requests 12, 14, and/or 16 require processing, a thread from the thread pool 4 may be activated and associated with a request for performing such processing. Further in accordance with the invention, threads from the thread pool 4 may be selectively deactivated or otherwise disassociated from a request, for example, when receiving a status code (not shown) indicating that an I/O operation associated with one of the sockets 24, 26, and/or 28 is pending.

The processing of various tasks associated with a particular client request (e.g., requests 12, 14, and/or 16) may be accomplished in accordance with one or more state machines, collectively referenced as 22. For example, state machines 22 may be provided for TCP data transmission, security protocol implementation (e.g., secure sockets layer (SSL) or transport layer security (TSL) implementations), data parsing, and/or authentication, as illustrated and described in greater detail hereinafter.

The state machines 22 associated with processing the client requests 12, 14, and/or 16 may be employed to further facilitate the activation of threads from the thread pool 4 using the completion port 20. For example, when a first thread 6 processing a task associated with client request 12 determines that an operation associated with the client request 12 is pending (e.g., on completion of an I/O operation), the context of the first thread 6 may be associated with the corresponding state machine 22 using a key (not shown), whereafter the first thread 6 is returned to the pool 4 of available threads (e.g., the thread 6 is deactivated). When the processing of the request 12 is subsequently restarted, execution proceeds at the appropriate place or state according to the corresponding state machine 22. The request may be restarted using the same thread or a different thread from the thread pool 4 (e.g., thread 6, 8, or 10). For instance, the completion port 20 may associate the context of thread 8 in the pool 4 with the state machine 22 corresponding with the client request 12 using the key in order to activate the thread 8 based on an event. In this regard, the event may be the receipt of a completion packet in the completion port 20 via one of the sockets 24, 26, or 28.

In addition to the thread pool 4, completion port 20, state machines 22, and keys (not shown), the client side HTTP stack component 2 may comprise a scheduler thread 30 adapted to activate an object scheduled to begin sending requests at a specific time. For example, the scheduler thread 30 may monitor a time-sorted queue inside a connection pool class (not shown) for some items to be activated at a specified time. Thread 30 may then call a specific external entry point to activate these items at the appropriate time. The scheduler thread 30 may be used for both placing objects from a client connections class (not shown) in a queue for delayed activation, as well as for timing out one or more operations that are in progress. For example, operations like send may be timed out by the scheduler thread 30 if they don't complete at specified time.

The component 2 may further comprise a domain name system (DNS) address resolution thread 32 adapted to resolve domain names into IP addresses. The DNS thread 32 may accept a structure from a queue (not shown) with data about DNS resolution that should be done, and is adapted to perform the resolution and signal an event in that structure about completion of the resolution. An exemplary DNS thread may be implemented via the following sample code:

```
class DNS_REQUEST
{
public:
    DNS_REQUEST( );
    ~DNS_REQUEST( );
    BYTE pszSymbolicServerName[MASSIVE_MAX_LEN_FOR_DNS_NAME];
    DWORD dwIpAddress[MASSIVE_MAX_NUMBER_OF_IP_ROUND_ROBIN];
    DWORD dwTCPPort;
    DWORD dwSslTCPPort;
    DWORD dwTimestamp;
    DWORD dwStatus;
    HRESULT Execute(CONNECTION_POOL *pMasterConnectionPool);
```

The client side HTTP stack component 2 may also comprise a timeout thread 34. The timeout thread 34 may comprise a list (not shown) of active sockets (e.g., sockets 24, 26, and 28) and timers (not shown) associated with each socket. The thread 34 may be adapted to selectively timeout at least one socket, such as socket 24, 26, or 28, according to a timer in the list.

The client side HTTP stack component 2 thus comprises a communication engine, oriented for client side communication over the HTTP protocol. The component 2 provides for high performance, high concurrency (in number of parallel connections), scalability, and flexibility in controlling every aspect of HTTP communication. In this manner, the component 2 may provide for processing of a large number of client requests (e.g., hundreds or thousands) using a limited number of threads (e.g., ten). This is accomplished using the pool of threads 4 blocking around the call to poll the status from the completion port 20. The thread pool 4 may be implemented without using any NT thread pool application program interface (API). Communications may be performed using sockets (e.g., sockets 24, 26, and/or 28) with non-blocking I/O completing on the completion port 20. In this manner, a large number of concurrent sockets may be accommodated. For example, ten to twenty thousand sockets may be concurrently open and performing I/O operations.

The connections or sockets 24, 26, and 28, moreover, may be abstracted in a C++ class (not shown) allowing a user to easily redefine behavior and intercept data at any level of communication. The implementation 2, moreover, is data driven, in that incoming data may activate the processing thereof. The selective activation of threads to process I/O operations facilitates this data driven operation. The client HTTP stack component 2 may advantageously be implemented as several classes (e.g., C++ classes). For example, the component 2 may be implemented as a communication thread pool class, a client connection class, a connection pool class, and a client simulator class, as illustrated and described in greater detail hereinafter. In addition, smaller classes may be provided for abstracting other functionality, such as an SSL encryptor class, an HTTP request class, and the like.

According to an aspect of the invention, the client side HTTP stack implementation may comprise several main classes. What follows is a description of one exemplary implementation having classes described hereinafter. However, it will be appreciated that other such implementations are contemplated as falling within the scope of the present invention. The component 2 may comprise a CCommunicationThreadPool class implementing one or more thread pools (e.g., thread pool 4) as well as performing connection object management. The thread pool 4 may operate on objects from a CBasicClientConnection class or a class derived therefrom. In addition, the CBasicClientConnection objects may be adapted to employ or use one or more other classes including a CMassiveHttpRequest class. By using the CMassiveHttpRequest class (or objects derived from it), a user may change the behavior of component 2, for example, for request storage.

One or more threads of the thread pool 4 may be implemented as a CCommunicationThreadPool class object and inside or internal code for running different types of thread pools. Such threads may include scheduler threads (e.g., scheduler thread 30) responsible for taking care of connection objects sorted in a time queue (not shown) and which continue to execute state machines (e.g., state machines 22) for selected connection objects at a specified (e.g., scheduled) time. In addition, I/O completion threads may be provided in the HTTP stack implementation component 2, which may be adapted to process completion status from the completion port 20, and to invoke execution of state machines 22 for the appropriate connection object for which an I/O operation has completed.

Connection threads may be provided, which are responsible for managing a connection queue and simulating asynchronous TCP connection establishment, for example, by monitoring multiple objects at the same time using a WSAConnect( ) function. The DNS thread 32 may be adapted to manage a DNS request queue (not shown) by processing DNS requests synchronously (but simulating asynchronous behavior) and by placing resolved addresses in an engine-wide DNS resolution cache (not shown). The timeout thread 34 is responsible for managing a timeout list (not shown), which may be partitioned for performance, and for timing out connection objects which have longer than specified I/O operation.

Connection objects may be employed in the component 2, such as C++ objects from the CBasicClientConnection class or a class derived therefrom. The thread pool (e.g., thread pool 4) may be adapted to operate the CBasicClientConnection class objects by activating them, or inserting and/or removing them into lists and/or queues. Basic logic and state machine code may be implemented in CBasicClientConnection objects. Two classes of connection objects may be provided with the exemplary component 2. The first is a CBasicClientConnection class, which implements the basic HTTP state machine with an SSL state machine inside. The second class of connection object is CClientConnection. This is derived from a first one adds implementation of HTTP authentication methods and redirection support.

Users may derive from one of these classes and add their implementation of desired behavior in an EventCallback( ) virtual C++ method. The connection objects may accordingly abstract data and actions necessary to establish TCP connection, for example, to a web server, and in addition may send HTTP requests and process HTTP responses. In accordance with the exemplary client HTTP stack implementation component 2, the following rules/relations may be applied to connection objects: there is a one to one relation between a connection object and an active TCP connection; one connection object can execute only one HTTP request at a time; one connection object can execute any number of HTTP requests, one after another; one connection object can establish/tear down any number of TCP connections, one after another; and every client connection should have one pointer to an associated CMassiveHttpRequest object during specific steps of execution, from which state machine code may extract information necessary to send an HTTP request.

The component 2 may further comprise one or more request objects. For example, during state machine execution, HTTP state machine code in the exemplary CBasicClientConnection class may need information for establishing a TCP connection or for producing an HTTP request. This code may expect the information to be present in an object from the CMassiveHttpRequest class or a derived class, and may have only a pointer to that object. Users are free to derive, overload and modify its behavior and may implement basic virtual functions for providing needed information.

Figure 2:
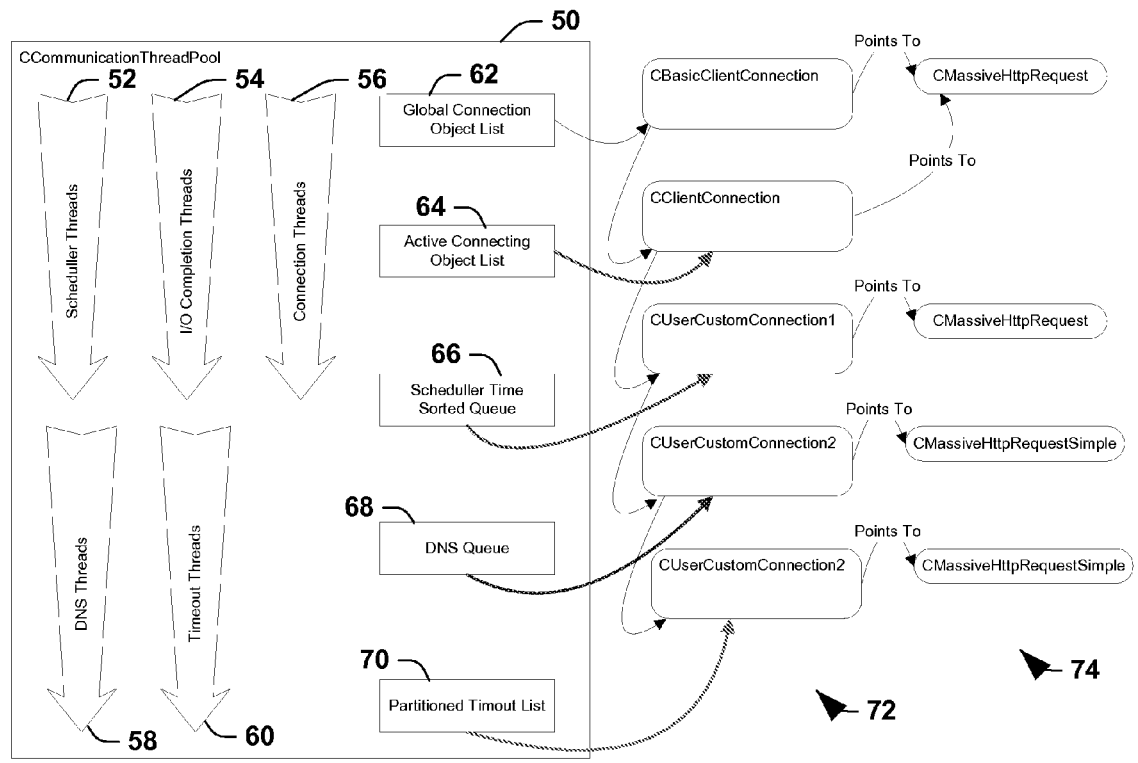
FIG. 2 is a schematic diagram illustrating relationships between several classes within an exemplary client side HTTP stack implementation.

Referring also to FIG. 2, exemplary relationships are illustrated between several classes of the component 2. An exemplary CCommunicationThreadPool thread pool 50 may be an instance of the object from this class having five types of threads running, scheduler threads 52, I/O completion threads 54, connection threads 56, DNS threads 58, and timeout threads 60. In addition, thread pool 50 may have five different types of queues/lists, such as a global connection object list 62, an active connection object list 64, a scheduler time sorted queue 66, a DNS queue 68, and a partitioned timeout list 70. These lists 62-70 may be employed for registering connection objects on which the thread pool 50 is operating, depending on action and conditions. The five lists or queues 62-70 are illustrated as pointing to CBasicClientConnection or derived class objects, collectively referenced as 72. These objects 72, in turn, may have pointers to unique or shared CMassiveHttpRequest or derived class objects, collectively referenced as 74, which may include information about a client request.

The client side HTTP stack implementation component 2 may be implemented as a C++ class library, which may be employed in a client computer by linking with a dynamic link library (DLL), for example, massive.dll, with main classes exported, or by linking with a static library massives.lib. C++ polymorphism may be used for extensibility. The component code may operate using the CBasicClientConnection class methods, and a user may extend the implementation by deriving from this class and modifying its behavior. For example, implementation of custom actions may be provided via an EventCallback( ) virtual function, wherein a connection object may be notified about changes in the state machines 22. In addition, a similar approach may be employed with respect to HTTP request storage, whereby a connection object operates with the CMassiveHttpRequest interface and a user adds a specific request storage.

The thread pool may be implemented, for example, using pure Win32 threads. The number of threads may, but need not be static, with changes only during engine's startup. The exemplary client HTTP stack implementation 2 may be further adapted to stop without closing existing connection objects. Thus, it is possible to run several instances of the component 2 in the same process. Completion port 20 may be used for HTTP send/receive operations over the TCP protocol. Scattered send Windsock function may be used for sending requests. In addition, a Windows NT LIST_ENTRY may be used for implementing lists of connection objects for some cases. In other cases, a time-sorted queue may be employed. Connection objects may be refcounted, and multiple entries in several places may be protected by critical sections. Contention of these critical sections may be minimal, for example, and may be only for race conditions in extremely rare cases. The operations performed by the exemplary HTTP implementation 2 are generally non-blocking, and only user actions in the EventCallback( ) virtual method can block some threads.

Figure 3:
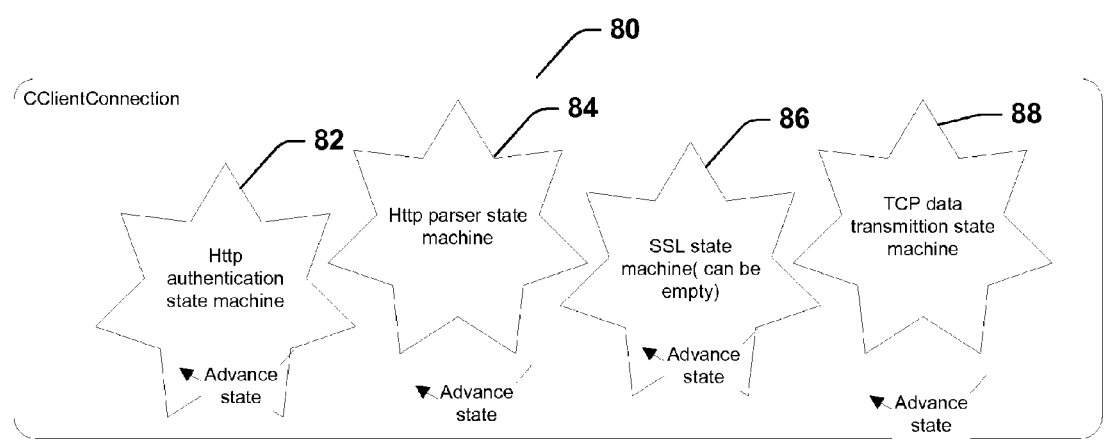
FIG. 3 is a schematic diagram illustrating several exemplary state machines according to another aspect of the invention.
Figure 4:
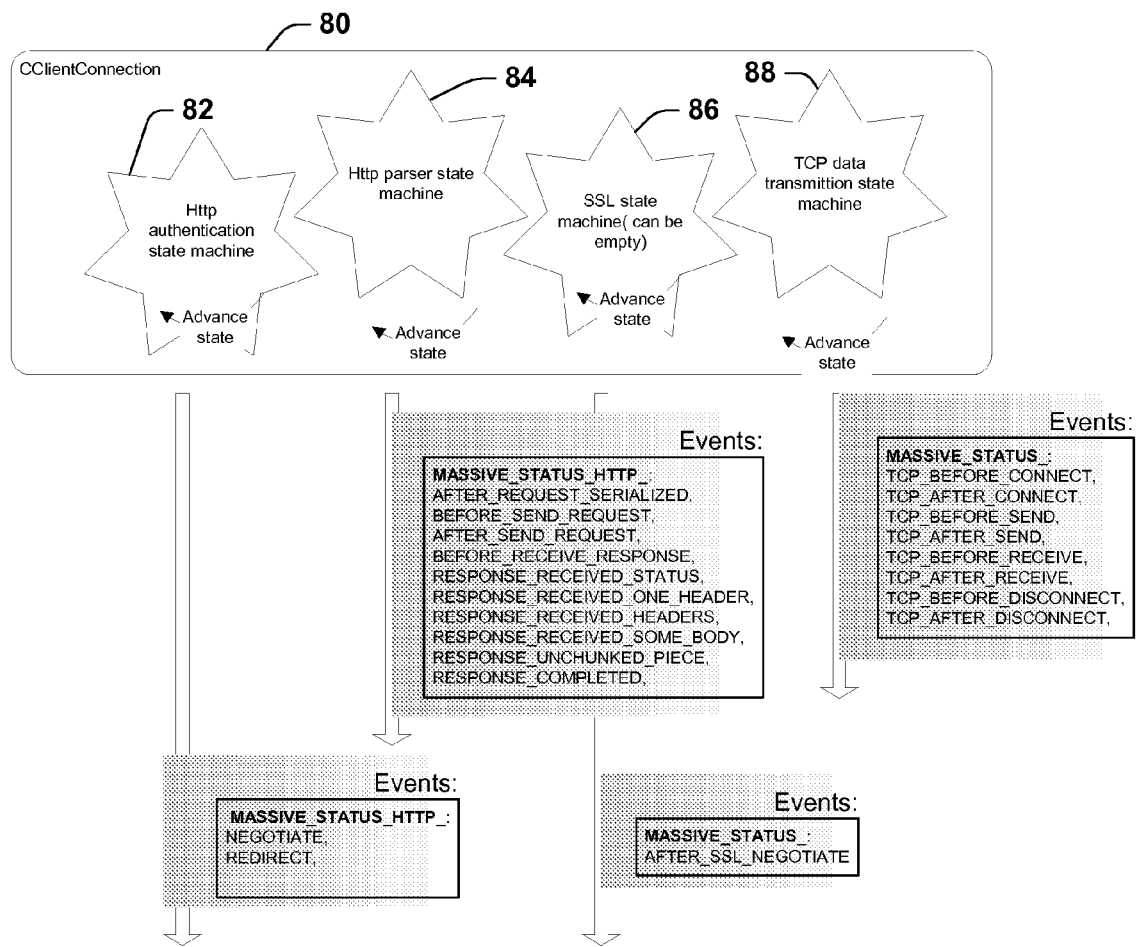
FIG. 4 is a schematic diagram further illustrating the state machines of FIG. 3, including various exemplary state machine states associated therewith.

Referring also to FIGS. 3 and 4, the client side HTTP stack implementation component 2 may comprise one or more state machines (e.g., state machines 22). The following is a description of an exemplary set of such state machines. However, it will be appreciated that other implementations having state machines other than those specifically illustrated and described are contemplated as falling within the scope of the present invention. In FIG. 3, an exemplary CClientConnection class 80 is illustrated comprising four state machines, HTTP authentication state machine 82, HTTP parser state machine 84, SSL state machine 86, and TCP data transmission state machine 88. These state machines 82, 84, 86, and 88 may affect each other to drive processing, wherein the state machines keep their respective states inside connection objects.

The CCommunicationThreadPool thread pool 80 may be used publicly via an application program interface (API). The following table describes several exemplary methods which may be available for public use:

The client HTTP stack implementation 2, moreover, may accumulate statistical information while running. A method QueryStatistics( ) may be provided in the component 2, which is adapted to return a pointer to the statistics structure inside the component 2. The following exemplary structure comprises information about data collected during a run:

```
typedef struct _MASSIVE_COMM_THREAD_STATS
{
    DWORD dwMaxParallelConnects;
    DWORD dwNumberOfClientConnectionObjects;
    DWORD dwNofRequestsMade;
    DWORD dwNofHttpErrors;
    DWORD dwNofHttpErrors1xx;
    DWORD dwNofHttpErrors2xx;
    DWORD dwNofHttpErrors3xx;
    DWORD dwNofHttpErrors4xx;
    DWORD dwNofHttpErrors5xx;
    DWORD dwNofHttpErrorsXxx;
    DWORD dwNofHttpErrors401;
    DWORD dwNofHttpErrors404;
    DWORD dwNofStateMachineErrors;
    DWORD dwNofDnsErrors;
    DWORD dwNofConnErrors;
    DWORD dwNofSendErrors;
    DWORD dwNofRecvErrors;
    DWORD dwNofSslErrors;
    DWORD dwNofConnections;
    DWORD dwStartTime;
    DWORD dwNofByteSent;
    DWORD dwNofBytesRecv;
    DWORD dwNofTimeouts;
    DWORD dwTimeToFirstByte;
    DWORD dwTimeToLastByte;
} MASSIVE_COMM_THREAD_STATS,
    *PMASSIVE_COMM_THREAD_STATS;
```

The exemplary HTTP implementation component 2 may further comprise two connection classes. Functionality may be divided between these two classes for simplicity, for example, by moving the HTTP authentication state machine 82 into the CClientConnection class 80, while the basic HTTP parser, SSL, and TCP transmission state machines 84, 86, and 88, respectively, are provided in the CBasicClientConnection class. For the most generous case, the upper class (e.g., CClientConnection class 80) may be used. In this case, the following table illustrates exemplary functionality, which may be visible when deriving from the CClientConnection class 80:

| Method/data member | Description |
| --- | --- |
| CCommunicationThreadPool( ); | Creates thread pool with default configuration |
| CCommunicationThreadPool( DWORD a_dwNofCompletionThreads, DWORD a_dwNofConnectionThreads, DWORD a_dwTimoutPrecission, DWORD a_dwTimeoutPeriod); | Creates custom configured thread pool |
| ~CCommunicationThreadPool( ); | Destroys thread pool |
| HRESULT Initialize ( ); | Performs initialization of thread pool. Only after this moment all data structures are allocated and threads started. |
| HRESULT ShutDown ( ); | Shutdowns thread pool by stopping threads and clearing allocations. Depending on refcount connections object will be freed |
| PMASSIVE_COMM_THREAD_STATS QueryStatistics( ); | Returns a pointer to the global engine statistics Structure |
| VOID ResetStatistics( ); | Resets engine statistics |

| Method/data member | Description |
| --- | --- |
| CBasicClientConnection( ) | Constructor, creates connection object |
| ~CBasicClientConnection( ) | Destructor. Should never be called explicitly!!! Refcounting is used instead |
| HRESULT Register ( CCommunicationThreadPool *a_pMaster) | Registers connection object with thread pool. If you intended to manage life time of this object or use it externally (not from thread pool threads) call AddRef( ) before registering with thread pool. |
| VOID SetRequest (CMassiveHttpRequest *pReq) | User should supply to the connection object a pointer to the request object. Connection object hen keeps that pointer and can request data from that request object at any time. |
| VOID SetRequestStartTime(DWORD dwTime); | Set's relative time for execution of next state in state machine. Zero means ASAP. |
| PMASSIVE_CLIENT_CONN_STATS QueryStatistics( ); | Returns a pointer to the internal data structure, which accounts statistics for the given connection object. |
| VOID ResetStatistics( ); | Resets statistics structure for the given object, also updates total Massive's engine statistics before reset with accumulated data in this object |
| HRESULT StartExecution( ); | Starts execution of state machine of the given object. |
| VOID SMGetLastError(DWORD dwErr); | Returns enum value about last state machine error |
| VOID ChangeStateTo ( M_STATE_MACHINE_STATE dwNewState); | Changes state of state machine into specified. Can be called only on Massive's thread in EventCallback method. |
| VOID ChangeStateToEx ( M_STATE_MACHINE_STATE dwNewState); | Changes state of state machine into specified. Can be called only outside Massive's threads. |
| M_STATE_MACHINE_STATE GetCurrentState( ); | Returns enum value about the current state machine state |
| BOOL IsConnected( ) | True is TCP connection is active |
| DWORD GetContentLeght( ) | returns content length of current response valid time to query: when all headers have been received possible values: 0xffffffff (NO_CONTENT_LENGTH) indicates that content length header wasn't found |
| BOOL WasChunkedEncoding( ) | returns BOOL value indicating was chunked encoding used or not valid time to query: when all headers have been received |
| DWORD AddRef( ) | Addref count. Call it if you want to use connection object outside Massive's threads |
| DWORD Release( ) | Decrements one refcount. Call it when you are done using connection object outside massive. Destructor will be called when refcount drops to zero. |
| DWORD GetRefCount( ) | Returns current refcount |
| HRESULT ExternalAbort( ); | Should be called from external thread to stop connection object and bring it's state machine to abort state |
| MASSIVE_ABORT_REASON QueryLastAbortReason( ) | Returns enum value about extended reason why connection object went into state machine abort state |
| DWORD m_dwNumberOfBytesWrittenAfterCompletion | Can be accessed only after getting event about TCP completing send operation |
| DWORD m_dwNumberOfBytesReadAfterCompletion; | Can be accessed only after getting event about TCP completing receive operation |
| DWORD m_dwHttpResponseCode; | Contains decimal code for last HTTP response. Can be accessed only after event MASSIVE_STATUS_HTTP_RESPONSE_RECEIVED_STATUS was received |
| DWORD m_dwHeaderCnt; | Contains number of HTTP headers received. Can be accessed only after MASSIVE_STATUS_HTTP_RESPONSE_RECEIVED_HEADERS event was received. |
| PCHAR m_pHeaderData; DWORD m_cbHeaderData; | this pointer points to the data for header, but it is zero terminated string there are to cases: 1. they can point directly into received or decoded buffer from SSL they can point to the inner buffer m_pHeaderString where copy of header splited between receive buffers are made pointer to header. IT IS ZERO TERMINATED STRING!!!!! nubmer of bytes what compose complete header starting at m_pHeaderData These data member can be accessed only after receiving MASSIVE_STATUS_HTTP_RESPONSE_RECEIVED_ONE_HEADER event |
| DWORD m_dwResponseBodyIdx1; DWORD m_dwResponseBodyIdx2; PBYTE m_pDataForHttpParsing; | idx1 is start (inclusive), idx2 is enc (inclusive also) position of byte for current response data(for body) to be retrieved from m_pDataForHttpParsing can be accessed only when MASSIVE_STATUS_HTTP_RESPONSE_RECEIVED_SOME_BODY or MASSIVE_STATUS_HTTP_RESPONSE_UNCHUNKED_PIECE events are received |
| PBYTE m_pTcpRecvDataPtr; DWORD m_dwTcpRecvDataLen; | When event MASSIVE_STATUS_TCP_AFTER_RECEIVE is received these data members point to the actual data received from socket. |

-continued

| Method/data member | Description |
| --- | --- |
| DWORD m_dwLastErrorForIoCompletion; | When events MASSIVE_STATUS_TCP_AFTER_SEND or MASSIVE_STATUS_TCP_AFTER_RECEIVE are received it has Win32 error code from completion port. |
| BOOL m_floWasTimeouted; | flag indicating was this request timeouted or not |
| DWORD m_dwMyPort; | local TCP port to which my socket is bound |
| HRESULT RedirectionHelper (PCHAR pszOriginalUrl); | Parses 3XX request and helps to prepare correct request after redirection. |
| BOOL QueryLastAuthenticationLeg( ) | TRUE or FALSE only during MASSIVE_STATUS_HTTP_RESPONSE_COMPLETED event tells is that last auth leg or not. |

The connection objects may be implemented by inheriting a C++ class from the CBasicClientConnection class or the CClientConnection class 80, and receiving calls in a virtual method EventCallback( ). The following table illustrates exemplary events which may be sent to the EventCallback( ) function during specific events in the connections object state machine:

| Events name | Explanation |
| --- | --- |
| MASSIVE_STATUS_SCHEDULER_SELECT | Scheduler has selected object and will be executing state machine |
| MASSIVE_STATUS_SCHEDULER_TIMEOUT | Timeout on pending I/O happened and I/O was aborted |
| MASSIVE_STATUS_STATE_MACHINE_ABORT | State machine was aborted for some reason |
| MASSIVE_STATUS_STATE_SELF_DESTRUCT | Connection object is going self destruct and will be deregistered from Massive's engine and probably deleted is refcount is zero. |
| MASSIVE_STATUS_TCP_BEFORE_CONNECT | Just before starting to execute TCP connect |
| MASSIVE_STATUS_TCP_AFTER_CONNECT | After TCP connect completed |
| MASSIVE_STATUS_TCP_BEFORE_SEND | Just before starting to execute TCP send |
| MASSIVE_STATUS_TCP_AFTER_SEND | TCP send completed |
| MASSIVE_STATUS_TCP_BEFORE_RECEIVE | Just before starting to execute TCP received |
| MASSIVE_STATUS_TCP_AFTER_RECEIVE | TCP receive completed |
| MASSIVE_STATUS_TCP_BEFORE_DISCONNECT | Just before closing TCP connection |
| MASSIVE_STATUS_TCP_AFTER_DISCONNECT | TCP connection was closed |
| MASSIVE_STATUS_HTTP_AFTER_REQUEST_SERIALIZED | After engine has serialized data for HTTP request |
| MASSIVE_STATUS_HTTP_BEFORE_SEND_REQUEST | HTTP state machine is going to send HTTP request |
| MASSIVE_STATUS_HTTP_AFTER_SEND_REQUEST | HTTP state machine had completed send of HTTP request |
| MASSIVE_STATUS_HTTP_BEFORE_RECEIVE_RESPONSE | HTTP state machine is going to receive HTTP response |
| MASSIVE_STATUS_HTTP_RESPONSE_RECEIVED_STATUS | HTTP state machine received status line of HTTP response |
| MASSIVE_STATUS_HTTP_RESPONSE_RECEIVED_ONE_HEADER | HTTP state machine received one header of HTTP response |
| MASSIVE_STATUS_HTTP_RESPONSE_RECEIVED_HEADERS | HTTP state machine received all headers of HTTP response |
| MASSIVE_STATUS_HTTP_RESPONSE_RECEIVED_SOME_BODY | HTTP state machine received some bytes of HTTP response body |
| MASSIVE_STATUS_HTTP_RESPONSE_UNCHUNKED_PIECE | HTTP state machine received and unchunked some bytes of chunked HTTP response body |
| MASSIVE_STATUS_HTTP_RESPONSE_COMPLETED | HTTP state machine completed reception of all HTTP response |
| MASSIVE_STATUS_HTTP_NEGOTIATE | HTTP state machine is negotiating HTTP authentication |
| MASSIVE_STATUS_HTTP_REDIRECT | HTTP state machine received redirect |
| MASSIVE_STATUS_DNS_BEFORE_QUERY | Just before doing DNS query |
| MASSIVE_STATUS_DNS_AFTER_QUERY | After DNS query was executed |
| MASSIVE_STATUS_AFTER_SSL_NEGOTIATE | After SSL connection was negotiated |

The various relationships between the exemplary events of the above table and the exemplary state machines 82, 84, 86, and 88 of the CClientConnection class 80 are illustrated in FIG. 4. The state machines 82, 84, 86, and 88 may have various states at a given time according to the progress of the task processing by an activated thread (e.g., from the thread pool 4). In addition, the exemplary state machines 82, 84, 86, and 88 may interact with or drive one another, whereby a transition in the state of one state machine 82, 84, 86, or 88 may affect the state of another state machine. A state machine state may be maintained per every connection object. Thus, when a thread (e.g., from the thread pool 4) is activated, the processing of a particular client request begins where the request processing left off, according to the corresponding state machine. A user may change the state of a state machine when notification is received in the EventCallback( ) function, or via external threads by calling a ChangeStateToEx( ) function. The following table illustrates some exemplary state machine states, and explanations therefore:

| State | Explanation |
| --- | --- |
| MASSIVE_STATE_INITIALIZED | Initialized |
| MASSIVE_STATE_DNS_IN_PROGRESS | DNS query is in progress |
| MASSIVE_STATE_AFTER_DNS | DNS completed |
| MASSIVE_STATE_READY_FOR_CONNECT | socket ready for connect |
| MASSIVE_STATE_CONNECT_PENDING | connect operation in progress |
| MASSIVE_STATE_CONNECT_COMPLETED | Connect completed |
| MASSIVE_STATE_HTTP_REQ_BEFORE_SEND | Ready to send request |
| MASSIVE_STATE_HTTP_REQ_SENDING | In progress of sending request |
| MASSIVE_STATE_HTTP_REQ_AFTER_SENT | Request was sent |
| MASSIVE_STATE_HTTP_RECEIVING_RESPONSE | In progress of receiving response |
| MASSIVE_STATE_HTTP_REQUEST_COMPLETE | HTTP request was completed |
| MASSIVE_STATE_RECONNECT | it is more like a command. If someone sets machine to this state it will reconnect |
| MASSIVE_STATE_SELFDESTRUCT | it is more like a command. if someone sets it will delete itself |
| MASSIVE_STATE_DISCONNECT | it is more like a command. if someone sets machine to this state it will disconnect |
| MASSIVE_STATE_MACHINE_ABORT | if something happens bad machine comes to this state and stops |
| MASSIVE_STATE_MACHINE_IDLE | t is a command. after setting state machine to this state Massive will do nothing |

In accordance with the exemplary HTTP stack implementation 2, each connection may accumulate statistical information while running. A QueryStatistics( ) method returns a pointer to the statistics structure inside the component 2. The following exemplary structure provides information relating to statistical data collected during such a run:

```
typedef struct _MASSIVE_CLIENT_CONN_STATS
{
    DWORD dwNofRequestsMade;
    DWORD dwNofHttpErrors;
    DWORD dwNofHttpErrors1xx;
    DWORD dwNofHttpErrors2xx;
    DWORD dwNofHttpErrors3xx;
    DWORD dwNofHttpErrors4xx;
    DWORD dwNofHttpErrors5xx;
    DWORD dwNofHttpErrorsXxx;
    DWORD dwNofHttpErrors401;
    DWORD dwNofHttpErrors404;
    DWORD dwNofStateMachineErrors;
    DWORD dwNofDnsErrors;
    DWORD dwNofConnErrors;
```

-continued

```
    DWORD dwNofSendErrors;
    DWORD dwNofRecvErrors;
    DWORD dwNofSslErrors;
    DWORD dwNofConnections;
    DWORD dwStartTime;
    DWORD dwNofByteSent;
    DWORD dwNofBytesRecv;
    DWORD dwNofTimeouts;
    DWORD dwTimeToFirstByte;
    DWORD dwTimeToLastByte;
    DWORD dwTimeToXByteHelper1; // private. no useful info there
    DWORD dwTimeToXByteHelper2; // private. no useful info there
} MASSIVE_CLIENT_CONN_STATS,
    *PMASSIVE_CLIENT_CONN_STATS;
```

Connection objects in the client side HTTP stack implementation component 2 may include a pointer to an associated request object from the CMassiveHttpRequest class or a class derived therefrom, and may use one or more methods therefrom. The inherited class may implement the following virtual member functions with such behavior:

| Method/data member | Explanation |
| --- | --- |
| CMassiveHttpRequest( ) | Constructor |
| virtual ~CMassiveHttpRequest( ) | Destructor |
| virtual HRESULT GetRequestForSent ( WSABUF *pWsaSendBufs, DWORD *pdwNofWsaBufs)=0 | Should fill WSABUF with at least two pointers: first one points to request mem location, second to headers (or headers and body) |
| virtual DWORD GetHttpAuthMethods( ) | Returns enum with request HTTP authentication methods |
| virtual VOID SetHttpAuthMethods( DWORD dwMethod) | Set's internal data member variable with enum value of requested HTTP authentication methods |
| virtual MASSIVE_SSL_LEVEL GetSslLevel( ) | Returns enum value of request SSL level |
| VOID SetSslLevel( MASSIVE_SSL_LEVEL dwLevel) | Sets internal member variable with requested enum value for SSL level |

-continued

| Method/data member | Explanation |
| --- | --- |
| virtual PCHAR GetHttpUserName( ) | Should return pointer to users name to be used for authentication |
| virtual PCHAR GetDomainName( ) | Should return pointer to domain name to be used for authentication |
| virtual PCHAR GetUserPassword( ) | Should return pointer to password to be used for authentication |
| virtual PCHAR GetServerName( ) | Should return pointer web servers name to which connection should be established |
| virtual DWORD GetServerHttpPort( ) | Should return TCP port number for destination web server |
| virtual VOID SetServerHttpPort(DWORD dwPort) | Sets into internal variable TCP port number for destination web server |
| virtual DWORD GetServerSslPort( ) | Should return port value for destination web server SSL port |
| virtual VOID SetServerSslPort(DWORD dwPort) | Sets into internal variable TCP port number for destination web server's SSL port |
| virtual DWORD GetProxyHttpPort( ) | Should return port value for destination proxy server's port |
| virtual VOID SetProxyHttpPort(DWORD dwPort) | |
| virtual DWORD GetProxySslPort( ) | Should return port value for destination proxy server's SSL port |
| virtual VOID SetProxySslPort(DWORD dwPort) | |
| virtual PCHAR GetPtrToHttpVerb(DWORD *cbLen) = 0 | Should return a pointer to HTTP verb in request and number of bytes pointed by that pointer |
| virtual PCHAR GetPtrToHttpUrl(DWORD *cbLen) = 0 | Should return a pointer to HTTP URL in request and number of bytes pointed by that pointer |

The following examples illustrate several of the features available using the exemplary client side HTTP stack implementation component 2. In the first example, it is desired to download pages of information (e.g., from a server computer system) as fast as possible.

```
Sample # 1
Starting thread
VOID
MaxSpeedSimulation(
    DWORD dwNofConnections,
    DWORD dwRunTime)
{
    HRESULT hr;
    DWORD i=0;
    PMASSIVE_COMM_THREAD_STATS pStats;
    // Create thread pool
    // 8 I/O threads, 2 connection threads, 30 sec timeout with
    // 5 sec precision
    CCommunicationThreadPool ThreadPool(8,2,5000,30000);
    // create simple request object
    CMassiveHttpRequestSimple req;
    // Fill request object with necessary info
    req.SetAuthNames("Administrator","Password","Domain");
    req.SetHttpAuthMethods (MASSIVE_AUTH_ANONYMOUS);
    req.SetSslLevel (MASSIVE_SSL_LEVEL_NONE);
    // Set request object with info about URL and headers
    hr = req.SetRequestInfo ((PBYTE)g_pszRequest,
        strlen(g_pszRequest),
        (PBYTE)myHeaders,
        strlen(myHeaders));
    // Set the name of web server
    req.SetServerName (g_pszServerName);
    // Start the engine
    hr = ThreadPool.Initialize ( );
    printf ("Massive engine start returned %x\n",hr);
    // Create a specified number of connections
    for (i=0;i<dwNofConnections;i++)
    {
```

-continued

```
    // Create connection object
    g_connections[i] = new CTestMyClientConnectionSpeedy;
    // Register client connection object with Connection Pool
    g_connections[i]->Register (&ThreadPool);
    // Initialize client connection object.
    hr = g_connections[i]->Initialize ( );
    // associate connection with request
    g_connections[i]->SetRequest (&req);
}
// This loop actually start execution of HTTP requests
for (i=0;i<dwNofConnections;i++)
{
    g_connections[i]->StartExecution ( );
}
for (i=0; i<dwRunTime; i++)
{
    Sleep (1000);
    pStats = ThreadPool.QueryStatistics( );
    PrintStatistics (pStats);
}
printf ("will start shutdown of engine\n");
hr = ThreadPool.ShutDown( );
printf ("engine shutdown returned %x\n",hr);
pStats = ThreadPool.QueryStatistics( );
PrintStatistics (pStats);
}
Implementation of Connection class
class CTestMyClientConnectionSpeedy: public CClientConnection
{
public:
    CTestMyClientConnectionSpeedy( ) {m_nOfReqSent = 0;};
    virtual ~CTestMyClientConnectionSpeedy( ) { };
    virtual DWORD EventCallback
    (M_NOTIFICATION_STATUS_EVENT dwEvent);
    DWORD m_nOfReqSent;
};
```

-continued

```
DWORD
CTestMyClientConnectionSpeedy::EventCallback (
    M_NOTIFICATION_STATUS_EVENT dwEvent)
{
  switch (dwEvent)
  {
      case MASSIVE_STATUS_TCP_BEFORE_CONNECT:
        ResetStatistics ( );
        break;
      case MASSIVE_STATUS_TCP_AFTER_DISCONNECT:
        // ok we are disconnecting for some reason.
        // just ask for reconnect
        ChangeStateTo (MASSIVE_STATE_RECONNECT);
        ResetStatistics ( );
        break;
      case MASSIVE_STATUS_HTTP_RESPONSE_COMPLETED:
        if (m_dwHttpResponseCode==200)
        {
          // simply do 5 request with keep alive, then reconnect
          m_nOfReqSent++;
          if (m_nOfReqSent%g_dwNofReqInConn)
            ChangeStateTo
              (MASSIVE_STATE_HTTP_REQ_BEFORE_SEND);
          else
            ChangeStateTo (MASSIVE_STATE_RECONNECT);
        }
        break;
      case MASSIVE_STATUS_STATE_MACHINE_ABORT:
        // something bad? try to reconnect
        // it just a test for speed
        ChangeStateTo (MASSIVE_STATE_RECONNECT);
        break;
  }
  return 0;
}
```

Event Flow During Execution

The following table illustrates and exemplary trace of events sent to the exemplary EventCallback( ) function during execution of the above sample #1, using 1 connection at a time for simplicity:

| State | Notification event |
| --- | --- |
| MASSIVE_STATE_INITIALIZED | |
| | SCHEDULLER_SELECT |
| MASSIVE_STATE_DNS_IN_PROGRESS | |
| | DNS_BEFORE_QUERY |
| MASSIVE_STATE_AFTER_DNS | |
| | DNS_AFTER_QUERY |
| | SCHEDULLER_SELECT |
| MASSIVE_STATE_READY_FOR_CONNECT | |
| | TCP_BEFORE_CONNECT |
| | TCP_BEFORE_CONNECT |
| MASSIVE_STATE_CONNECT_PENDING | |
| MASSIVE_STATE_CONNECT_COMPLETED | |
| | TCP_AFTER_CONNECT |
| MASSIVE_STATE_HTTP_REQ_BEFORE_SEND | |
| | HTTP_BEFORE_SEND_REQUEST |
| | HTTP_AFTER_REQUEST_SERIALIZED |
| MASSIVE_STATE_HTTP_REQ_BEFORE_SEND | |
| | TCP_BEFORE_SEND |
| MASSIVE_STATE_HTTP_REQ_SENDING | |
| | TCP_AFTER_SEND |
| | HTTP_AFTER_SEND_REQUEST |
| MASSIVE_STATE_HTTP_REQ_AFTER_SENT | |
| | HTTP_BEFORE_RECEIVE_RESPONSE |
| MASSIVE_STATE_HTTP_RECEIVING_RESPONSE | |
| | HTTP_BEFORE_RECEIVE_RESPONSE |
| | TCP_BEFORE_RECEIVE |
| | TCP_AFTER_RECEIVE |
| | HTTP_RESPONSE_RECEIVED_STATUS: HTTP/1.1 200 OK |
| | HTTP_RESPONSE_RECEIVED_ONE_HEADER: HTTP/1.1 200 OK |
| | HTTP_RESPONSE_RECEIVED_ONE_HEADER: Server: Microsoft-IIS/5.0 |
| | HTTP_RESPONSE_RECEIVED_ONE_HEADER: Date: Sun, 09 Apr 2000 19:01:50 GMT |
| | HTTP_RESPONSE_RECEIVED_ONE_HEADER: Content-Type: image/gif |
| | HTTP_RESPONSE_RECEIVED_ONE_HEADER: Accept-Ranges: bytes |
| | HTTP_RESPONSE_RECEIVED_ONE_HEADER: Last-Modified: Fri, 04 Jun 1999 07:13:40 GMT |
| | HTTP_RESPONSE_RECEIVED_ONE_HEADER: ETag: "0ea64c559aebe1:813" |
| | HTTP_RESPONSE_RECEIVED_ONE_HEADER: Content-Length: 1577 |
| | HTTP_RESPONSE_RECEIVED_HEADERS Total headers=8 |
| | HTTP_RESPONSE_RECEIVED_SOME_BODY body idx1=226 idx2=1802 |
| | HTTP_RESPONSE_COMPLETED |

-continued

| State | Notification event |
|---|---|
| MASSIVE_STATE_HTTP_REQUEST_COMPLETE | |
| MASSIVE_STATE_RECONNECT | |

Sample #2

The following sample #2 demonstrates advanced features of the component 2, including the ability to stop a connection object in some specific state, to do something else, and then to continue from where it was left off:

```
Control thread
   printf ("Request were created\n");
   for (i=0;i<MAX_MASSIVE_CONNECTIONS_FOR_TEST;i++)
       pCons[i]->StartExecution ( );
   printf ("Executions were queued\n");
   for (i=0;i<MAX_MASSIVE_CONNECTIONS_FOR_TEST;i++)
   {
      do
      {
      r = WaitForSingleObject (pCons[i]->m_hSignal,1000);
      }
      while (r!= WAIT_OBJECT_0);
      if (i%100==0) printf ("waited for %d objects\n",i);
   }
   printf ("Requests were sent . . . doing something long lasting\n");
   Sleep (10000);
   for (i=0;i<MAX_MASSIVE_CONNECTIONS_FOR_TEST;i++)
   {
       pCons[i]->ChangeStateToEx
       (MASSIVE_STATE_HTTP_REQ_AFTER_SENT);
   }
   printf ("Execution was continued\n");
Connection object's EventCallback implementation
DWORD
CClientConnectionSimulation4::EventCallback
(M_NOTIFICATION_STATUS_EVENT dwEvent)
{
    PRINTF ("Event %d error=%d state=%d\n",dwEvent,
    SMGetLastError( ),
    GetCurrentState( ));
    switch (dwEvent)
    {
    case MASSIVE_STATUS_HTTP_AFTER_SEND_REQUEST:
       {
          ChangeStateTo (MASSIVE_STATE_MACHINE_IDLE);
          SetEvent (m_hSignal);
          break;
       }
    . . .
    return 0;
}
```

Figure 5:
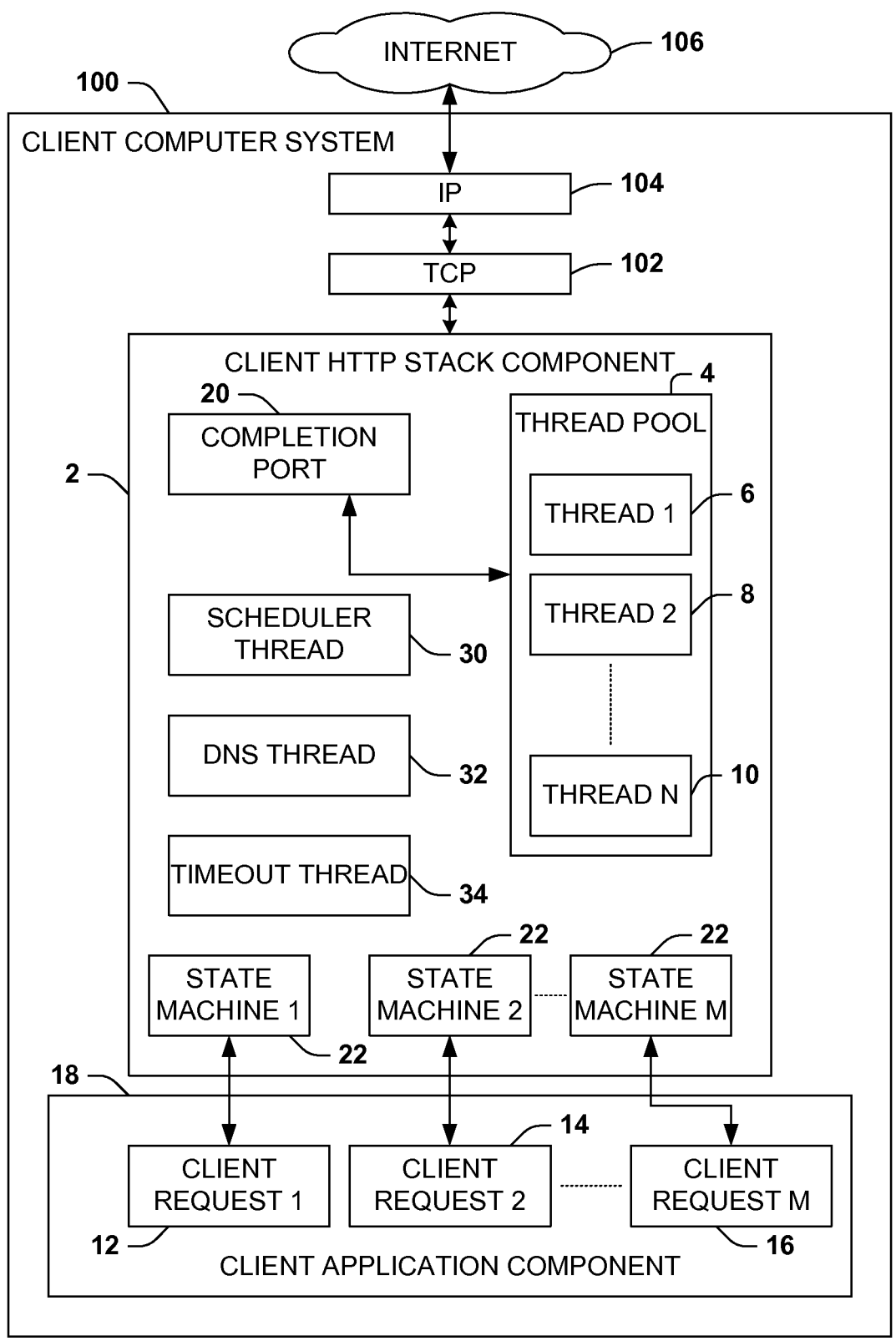
FIG. 5 is a schematic diagram illustrating an exemplary client computer system with a client side HTTP stack implementation according to the invention.

It will be appreciated that the above described client side HTTP stack implementation 2 is but one of many possible implementations which fall within the scope of the present invention. Referring now to FIG. 5, the HTTP stack implementation 2 may advantageously be employed in association with a client computer system 100. The system 100 may further comprise a TCP layer implementation 102 and an IP layer implementation 104. Together with the implementations 102 and 104, the client HTTP stack implementation 2 provides interfacing for processing one or more of the client requests 12, 14, and/or 16 from the client application component 18. For example, these client requests 12, 14, and/or 16 may be processed by the component 2 through accessing the Internet or other network 106 via the TCP and IP layers 102 and 104, respectively.

As described above with respect to FIG. 1, the exemplary component 2 comprises a thread pool 4 having N threads 6, 8, and 10, where N is an integer, for executing or otherwise processing one or more of the M client requests 12, 14, and 16, where M is an integer greater than N. For example, the threads 6, 8, and 10 of the thread pool 4 may be scheduled for execution of a particular request (e.g., request 12, 14, or 16) according to a concurrency value (not shown) associated with a completion port 20. Thus, where the concurrency value (e.g., 10) for the completion port 20 has not been reached, and one or more of the M requests 12, 14, and/or 16 require processing, a thread from the thread pool 4 may be activated and associated with a request for performing such processing. Further in accordance with the invention, threads may be selectively activated by the completion port 20, for example, when a completion packet is received in the completion port 20.

The processing of various tasks associated with a particular client request may be accomplished in accordance with one or more of the state machines 22. For example, state machines 22 may be provided for TCP data transmission (e.g., state machine 88 of FIGS. 3 and 4), security protocol implementation (e.g., secure sockets layer (SSL) implementation state machine 86), data parsing (e.g., HTTP parser state machine 84), and/or for authentication (e.g., HTTP authentication state machine 82). The state machines 22 associated with processing the client requests 12, 14, and/or 16 may thus be employed to further facilitate the activation of threads from the thread pool 4 using the completion port 20.

For example, when a first thread 6 processing a task associated with client request 12 determines that the task is pending (e.g., an I/O operation), the context of the first thread 6 may be associated with the corresponding state machine 22 using a key (not shown), and the first thread 6 may then be deactivated. Thereafter, the first thread 6 returns to the thread pool 4. When the processing of the request 12 is subsequently restarted, execution proceeds at the appropriate place according to the state machine 22. The request may be restarted using the same or a different thread from the thread pool 4 (e.g., thread 6, 8, or 10). For instance, the completion port 20 may associate the context of thread 8 in the pool 4 with the state machine 22 using the key in order to activate the thread 8 based on an event. In this regard, the event may be the receipt of a completion packet in the completion port 20.

Figure 6:
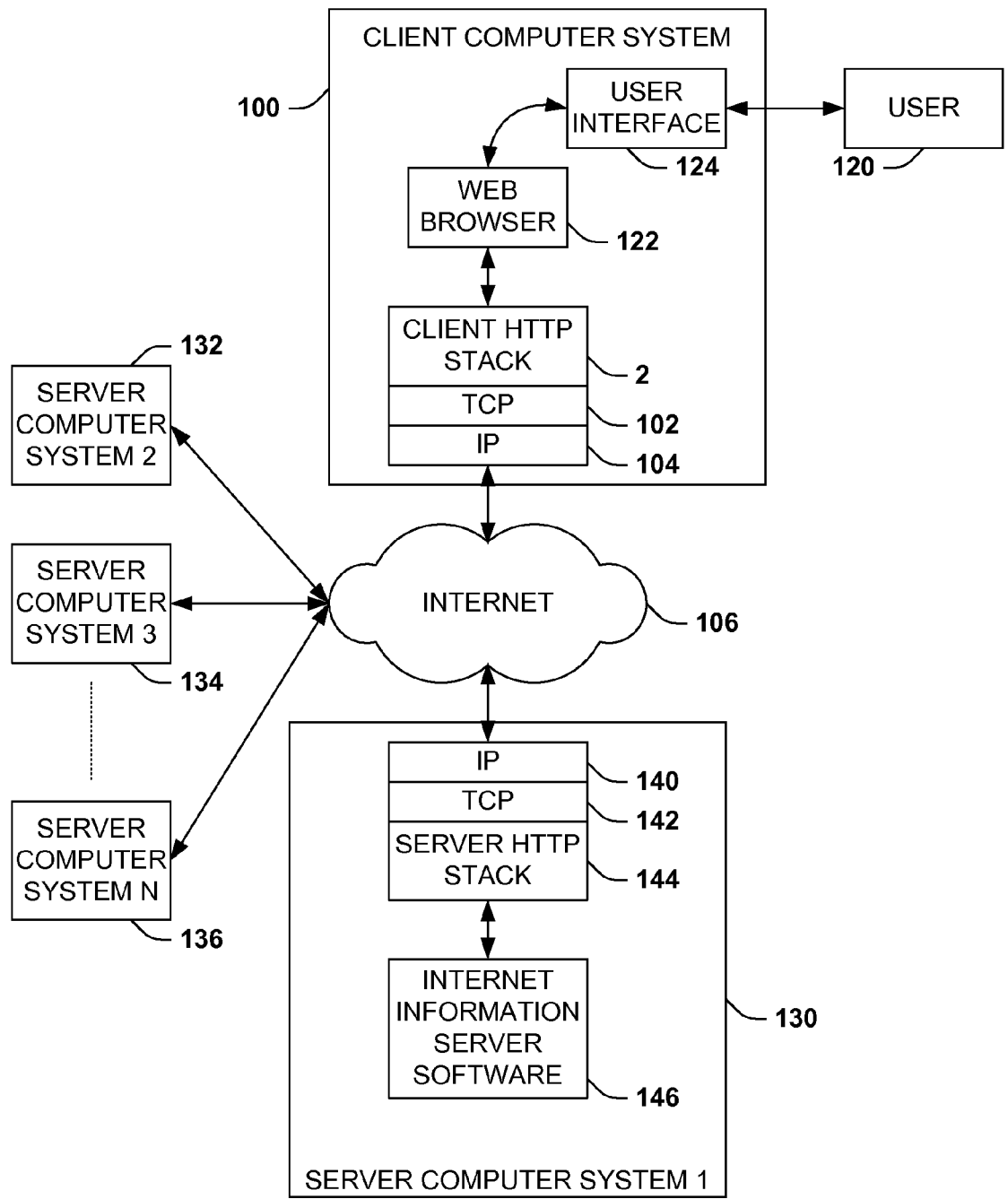
FIG. 6 is a schematic diagram illustrating an exemplary client computer system accessing one or more server computers via the Internet.
Figure 7:
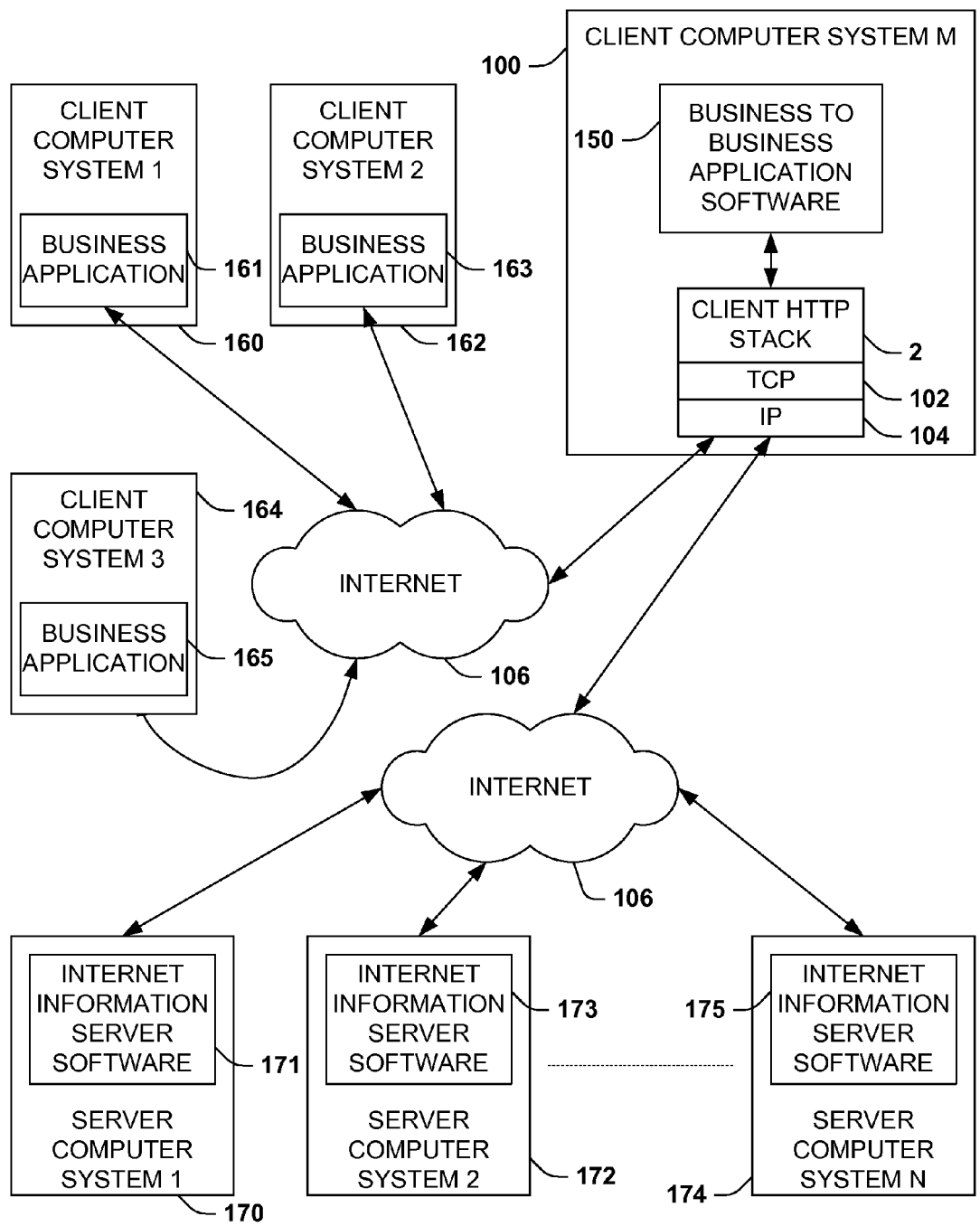
FIG. 7 is a schematic diagram illustrating another exemplary client computer system having a business-to-business application adapted to obtain data or information from a plurality of server computers via the Internet according to requests from a plurality of applications running on separate client computers.
Figure 8:
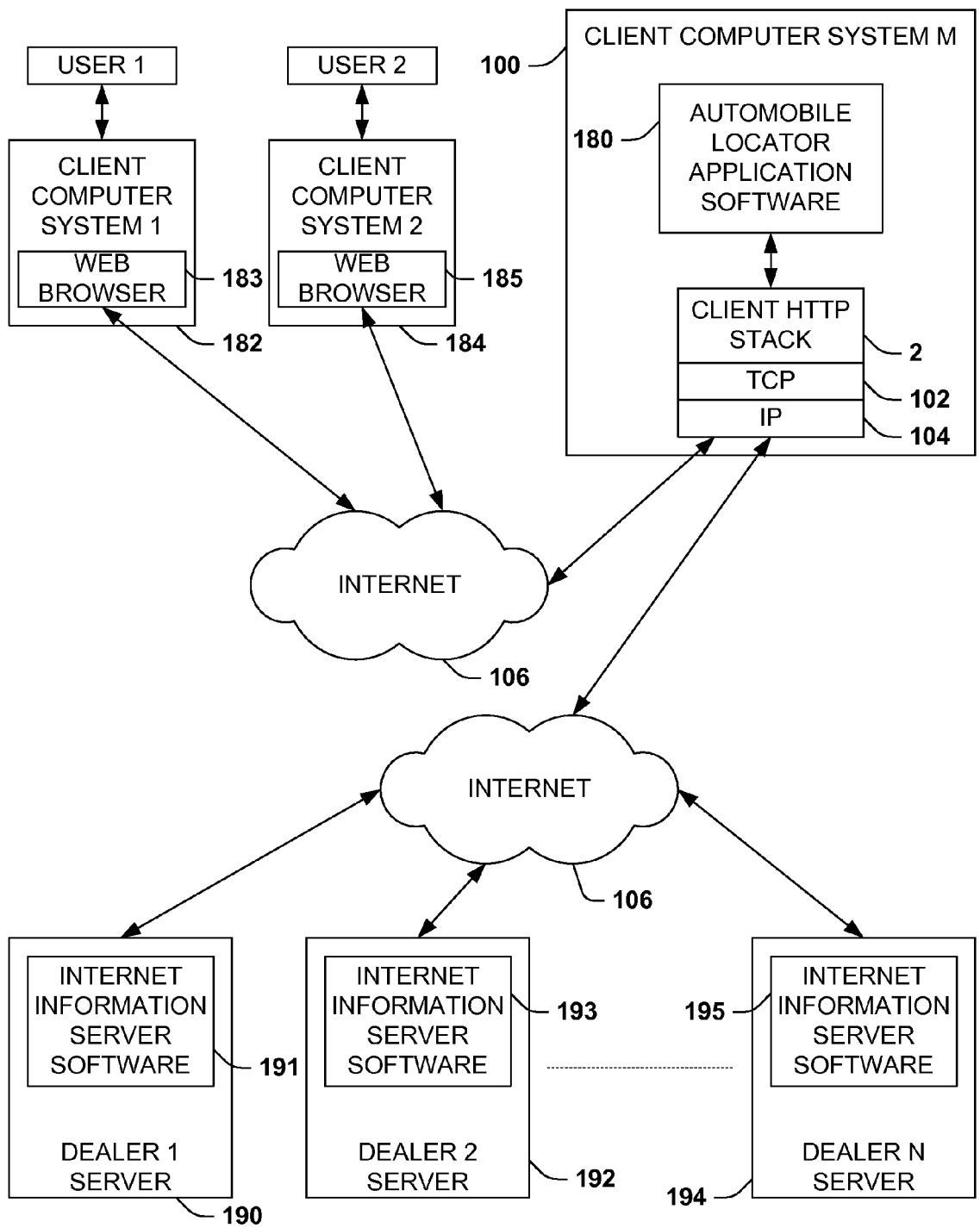
FIG. 8 is a schematic diagram illustrating another exemplary client computer system adapted to obtain information relating to availability of automobiles from a plurality of dealer server computers according to requests from a plurality of web browsers.

Referring now to FIGS. 6-8, the exemplary client side HTTP stack implementation 2 may be employed in a variety of situations wherein the improved client request processing capabilities thereof provide performance advantages over prior client HTTP stack implementations. In FIG. 6, the client computer system 100 includes the client side HTTP stack implementation 2, the TCP layer implementation 102, and the IP layer implementation 104. A user 120 may operate a web browser application component 122 via a user interface component 124, whereby the web browser application 122 may generate one or more client requests for obtaining data, images, or other data from one or more server computer systems 130, 132, 134, and/or 136 via the Internet 106.

The exemplary server computer system 130 may comprise a server side IP layer implementation 140, a server side TCP layer implementation 142, and a server side HTTP stack implementation 144, providing interfacing between the Internet 106 and an Internet information server software application 146. Similar network layer implementations and applications (not shown) may be provided in the server computer systems 132, 134, and 136. The exemplary client side HTTP stack 2 provides for expeditious servicing of more than one client request through employment of multiple threads (e.g., threads 6, 8, and 10 of thread pool 4) which may be selectively activated to perform task processing, and selectively deactivated (e.g., upon determining that an operation being processed is pending), in order to provide optimal or improved request throughput in the client computer 100. While the web browser application 122 of the client system 100 may not generate a large number of such client requests, the client HTTP stack 2 may be employed in association with client side applications which require processing of many hundreds or thousands of requests in a short period of time.

Referring now to FIG. 7, an exemplary client computer system 100 may comprise a business-to-business application software component 150, together with the client HTTP stack 2, TCP layer 102 and the IP layer 104. The application component 150 may comprise, for example, transaction processing features such as corporate credit verification functionality or the like. Other client computers 160, 162, and/or 164 having business application components 161, 163, and 165, respectively, may access the system 100 via the Internet 106. For instance, the client computers 160, 162, and 164 may be operated by banks or other lending institutions, and the business application components 161, 163, and/or 165 may generate requests for credit information relating to potential loan clients.

Any number of such client computers (e.g., computer systems 160, 162, and 164) may thus send requests to the business-to-business application software component 150 running in the system 100. The application component 150, in turn, may be adapted to obtain updated credit information from one or more server computer systems 170, 172, and/or 174, having Internet information server software components 171, 173, and 175 installed thereon, respectively. Thus, the client computer system 100 may need to generate a large number of client requests in a short period of time, in order to timely service the requests received from the client computers 160, 162, and/or 164.

The server computer systems 170, 172, and/or 174, moreover, may individually include credit information databases (not shown) from which credit information may be obtained and forwarded to the exemplary client computer system 100. In this scenario, the system 100 must process large numbers of requests and responses from the server computer systems 170, 172, and 174 in a timely fashion, in order to satisfy the needs of the business-to-business application software component 150. Conventional client side stack implementations providing only one I/O socket and a single execution thread fail to provide the necessary request processing throughput. The use of multi-threading techniques (e.g., the thread pool 4) and the provision of one or more completion ports (e.g., completion port 20) in the client HTTP stack implementation 2 thus provide significant advantages over the prior methods and implementations.

Referring now to FIG. 8, another example is illustrated, wherein the advantages of the present invention may be utilized. In this example, the exemplary client computer system 100 may comprise an automobile locator application software component 180 adapted to locate available motor vehicles in response to requests from one or more client computers 182 and 184. The computers 182 and 184 may comprise web browsers 183 and 185, respectively, through which users 186 and 188 may generate one or more search requests.

For example, the users 186 and 188 may desire to search for pricing, availability, and/or option information relating to cars and trucks in a given geographical region. The automobile locator application 180 may be consulted via requests from the browsers 183 and 185. The application 180, in turn, may generate a number of requests for such information via the Internet 106, from one or more automobile dealer server systems 190, 192, and/or 194. These systems 190, 192, and 194 may comprise Internet information server software components 191, 193, and 195, respectively.

The systems 190, 192, and 194 may then generate appropriate responses to the requests from the client system 100 in order to provide updated information to the application component 180. As there may be a large number of such client computers (e.g., computers 182 and 184) requesting information from the automobile locator application 180, there may be a large number of requests generated by the component 180 (e.g., for information from servers 190, 192, and/or 194) as well as responses thereto, which need to be processed by the client side HTTP stack 2. The increased request processing throughput achievable according to the invention thus provides significant advantages over prior single socket, single thread client side HTTP stack implementation techniques.

Figure 9:
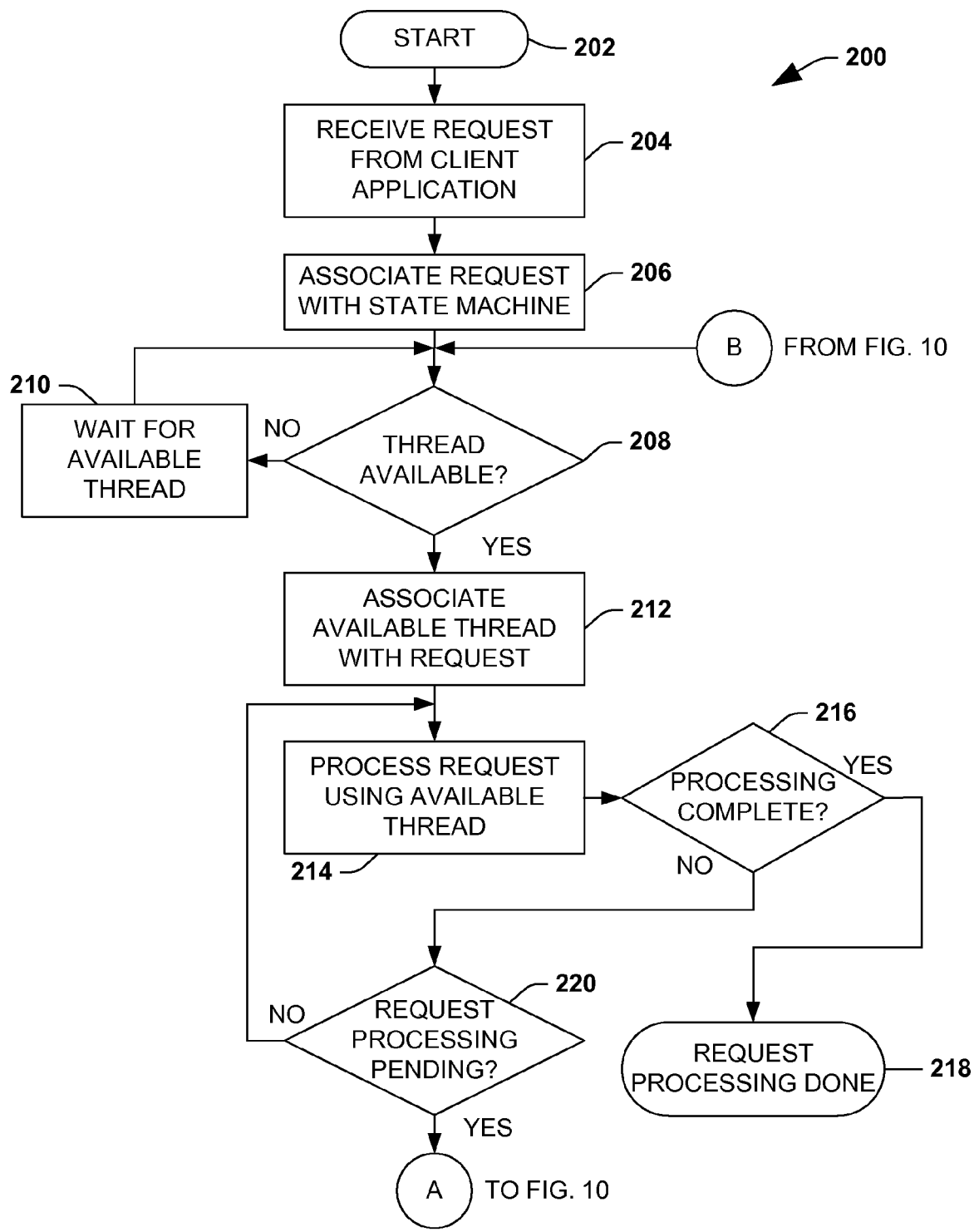
FIG. 9 is a flow diagram illustrating an exemplary method of implementing a client side HTTP stack according to another aspect of the invention.
Figure 10:
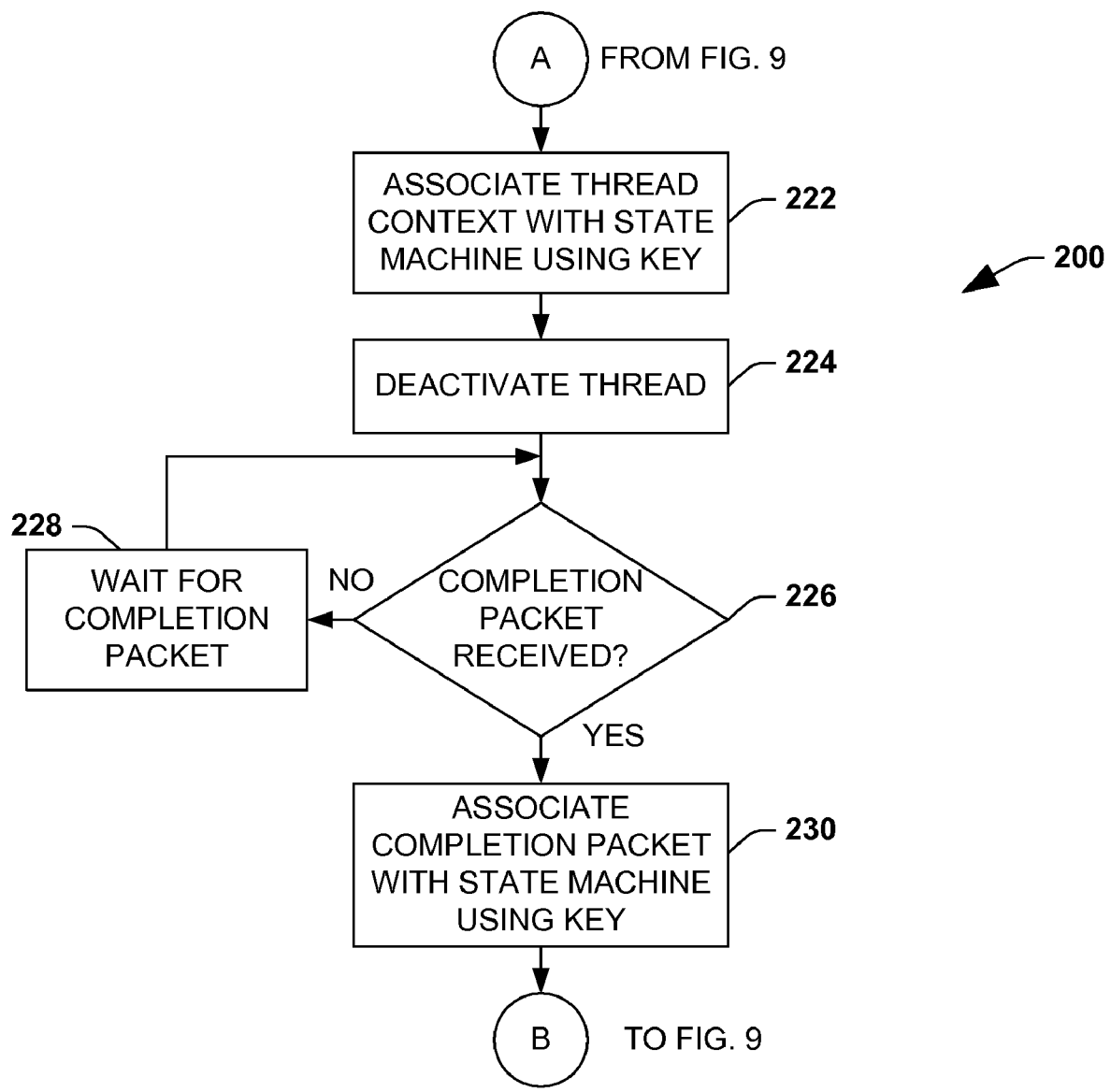
FIG. 10 is a flow diagram further illustrating the exemplary method of FIG. 9.

FIGS. 9 and 10 illustrate an exemplary method 200 of implementing a client side HTTP stack. Although the method 200 is illustrated and described herein as a series of steps, the present invention is not limited by the illustrated ordering of steps. Thus, in accordance with the invention, some steps may occur in different orders and/or concurrently with other steps from that shown and described herein. In addition, not all illustrated steps may be required to implement a methodology in accordance with the invention. The method 200, moreover, may be implemented in various systems illustrated and described herein, as well as others not specifically described.

Beginning at step 202, the method 200 comprises receiving a request from a client application at step 204. For example, the exemplary client HTTP stack 2 of system 100 may receive one or more such requests from the automobile locator application software component 180. At step 206, the received request is associated with a state machine, and the availability of a thread for processing the request is determined at decision step 208. If no thread is available, the method 200 waits for an available thread at step 210. Once a thread becomes available at step 208, the available thread is associated with the request at step 212.

Thereafter, the request is processed using the thread at step 214. If the processing of the request is completed at step 216, the method ends at step 218. Otherwise, a determination is made at step 220 as to whether the processing of the request is pending (e.g., waiting for an I/O operation to complete). If not, the method 200 proceeds again to step 214, where the request is further processed using the available thread.

If the thread determines that processing of the request is pending, the method 200 proceeds from step 220 to step 222 of FIG. 10, whereat the thread context is associated with a state machine using a key. The thread is then deactivated and returned to the thread pool (e.g., thread pool 4) at step 224. A determination is then made at step 226 as to whether a completion packet has been received (e.g., in the completion port 20). If not, the method 200 waits for such a packet at step 228. Once such a completion packet is received at step 226, the method 200 proceeds to step 230, whereat the received completion packet is associated with the state machine using the key. The method 200 then returns to step 208 of FIG. 9, where the availability of a thread (e.g., the same thread used previously or another thread from the thread pool 4) is again checked.

The exemplary method 200 thus provides for selective activation and deactivation of processing threads in a multi-threading system, whereby improved request processing is achieved. The method 200 may thus be advantageously employed in processing client side requests in a computer system (e.g., system 100), particularly where a large number of such requests must be processed in a short period of time.

Figure 11:
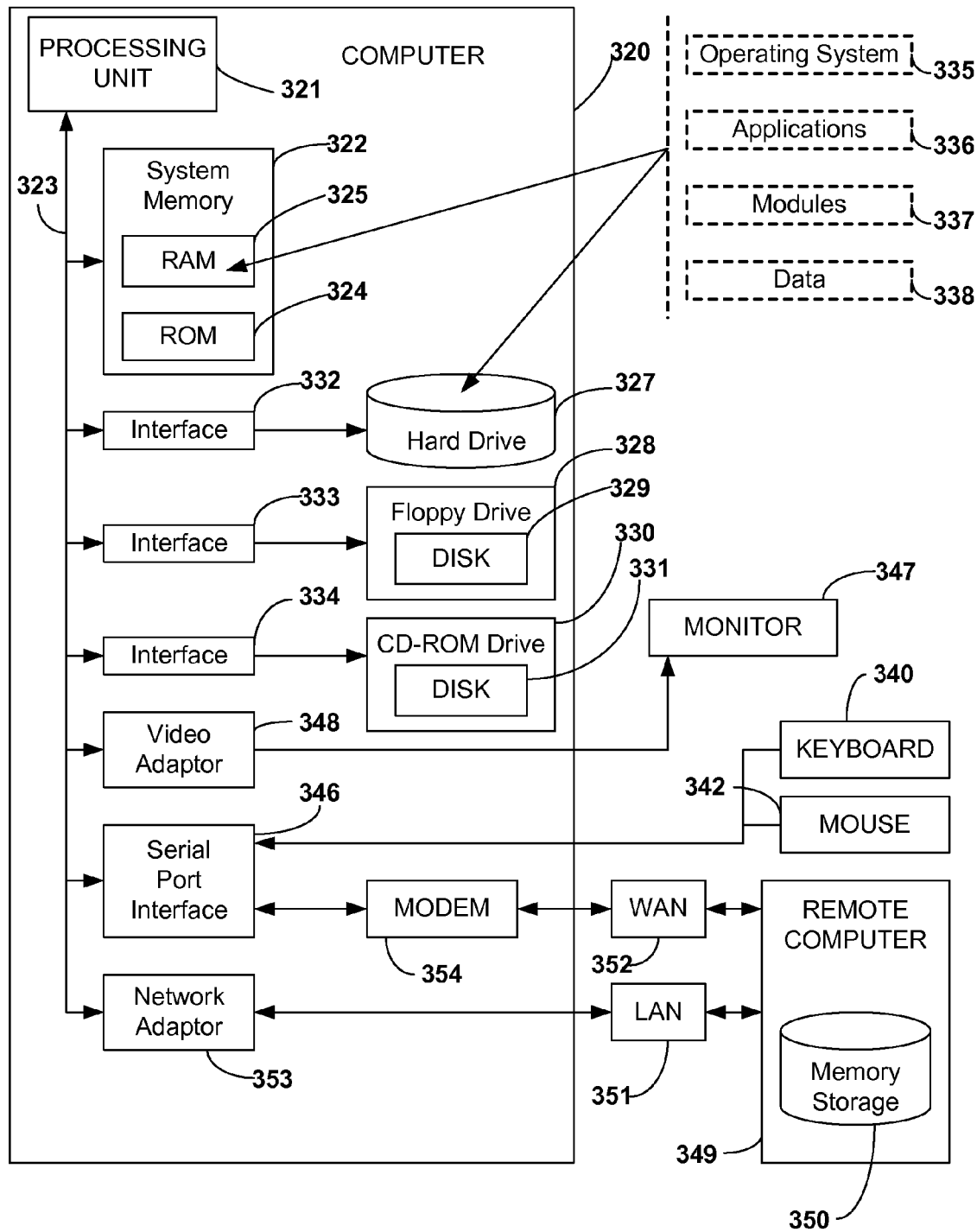
FIG. 11 is a schematic block diagram illustrating an exemplary operating environment in which one or more aspects of the invention may be implemented.

In order to provide a context for the various aspects of the invention, FIG. 11 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 310 for implementing various aspects of the invention includes a computer 312, including a processing unit 314, a system memory 316, and a system bus 318 that couples various system components including the system memory to the processing unit 314. The processing unit 314 may be any of various commercially available processors, including but not limited to Intel x86, Pentium®, and compatible microprocessors from Intel and others, including Cyrix, AMD and Nexgen; Alpha®, from Digital; MIPS®, from MIPS Technology, NEC, IDT, Siemens, and others; and the PowerPC®, from IBM and Motorola. Dual microprocessors and other multi-processor architectures also can be used as the processing unit 314.

The system bus 318 may be any of several types of bus structure including a memory bus or memory controller, a peripheral bus, and a local bus using any of a variety of conventional bus architectures such as PCI, VESA, Microchannel, ISA, and EISA, to name a few. The computer 312 memory may include read only memory (ROM) 320 and random access memory (RAM) 322. A basic input/output system (BIOS), containing the basic routines that help to transfer information between elements within the computer 312, such as during start-up, is stored in ROM 320.

The computer 312 further includes a hard disk drive 324, a magnetic disk drive 326, e.g., to read from or write to a removable disk 328, and an optical disk drive 330, e.g., for reading a CD-ROM disk 332 or to read from or write to other optical media. The hard disk drive 324, magnetic disk drive 326, and optical disk drive 330 are connected to the system bus 318 by a hard disk drive interface 334, a magnetic disk drive interface 336, and an optical drive interface 338, respectively. The drives and their associated computer-readable media provide nonvolatile storage of data, data structures, computer-executable instructions, etc. for the computer 312, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 322, including an operating system 340, one or more application programs 342, other program modules 344, and program data 346. The operating system 340 in the illustrated computer is, for example, the "Microsoft Windows NT" operating system, although it is to be appreciated that the present invention may be implemented with other operating systems or combinations of operating systems, such as UNIX, LINUX, etc.

A user may enter commands and information into the computer 312 through a keyboard 348 and a pointing device, such as a mouse 350. Other input devices (not shown) may include a microphone, an IR remote control, a joystick, a game pad, a satellite dish, a scanner, or the like. These and other input devices are often connected to the processing unit 314 through a serial port interface 352 that is coupled to the system bus 318, but may be connected by other interfaces, such as a parallel port, a game port, a universal serial bus ("USB"), an IR interface, etc. A monitor 354 or other type of display device is also connected to the system bus 318 via an interface, such as a video adapter 356. In addition to the monitor, a computer typically includes other peripheral output devices (not shown), such as speakers, printers etc.

The computer 312 may operate in a networked environment using logical connections to one or more remote computers, such as a remote computer(s) 358. The remote computer(s) 358 may be a workstation, a server computer, a router, a personal computer, microprocessor based entertainment appliance (e.g., a WebTV client system), a peer device or other common network node, and typically includes many or all of the elements described relative to the computer 312, although, for purposes of brevity, only a memory storage device 360 is illustrated. The logical connections depicted include a local area network (LAN) 362 and a wide area network (WAN) 364. Such networking environments are commonplace in offices, enterprise-wide computer networks, intranets and the Internet.

When used in a LAN networking environment, the computer 312 is connected to the local network 362 through a network interface or adapter 366. When used in a WAN networking environment, the computer 312 typically includes a modem 368, or is connected to a communications server on the LAN, or has other means for establishing communications over the WAN 364, such as the Internet. The modem 368, which may be internal or external, is connected to the system bus 318 via the serial port interface 352 (e.g., for communications over POTS). The modem 368, alternatively, may be connected to the system bus 318 via the network interface or adapter 366 (e.g., for communication over DSL, cable, satellite, etc.). In a networked environment, program modules depicted relative to the computer 312, or portions thereof, may be stored in the remote memory storage device 360. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A client side HTTP stack software component stored in a memory and executed by a processor for processing requests, comprising:
   at least one completion port object;
   at least one client side socket, wherein each of the at least one client side sockets is associated with the at least one completion port object using a key, wherein the use of completion port objects allows pending threads to be deactivated whereby execution of tasks related to a given request are suspended until the completion port object receives an associated completion packet at the client side socket that is identified using the associated key;
   a thread pool comprising a plurality of threads that process tasks associated with at least one client side request, wherein any deactivated pending threads are automatically returned to the thread pool and become available for use with other client requests, such that as client requests are received and as pending requests become ready, the next available thread is used to process the client request or previously pending request; and
   a client side state machine associated with the at least one request, wherein the client side state machine maintains context information for each pending request, such that upon receiving an indication that the pending request has become ready, the next available thread resumes execution at the appropriate state using the context information.

2. The client side HTTP stack implementation of claim 1, further comprising a scheduler thread that activates an object scheduled to begin sending requests at a specific time.

3. The client side HTTP stack implementation of claim 1, further comprising a DNS thread that resolves domain names into IP addresses.

4. The client side HTTP stack implementation of claim 1, further comprising a timeout thread with a list of active sockets and timers associated with each socket, and that can selectively timeout at least one socket according to at least one timer in the list.

5. The client side HTTP stack implementation of claim 4, further comprising a DNS thread that resolves domain names into IP addresses.

6. A software component storing in a memory and executed by a processor for implementing a client side HTTP stack, comprising:
   at least one completion port object;
   at least one client side socket, wherein each of the at least one client side sockets is associated with the at least one completion port object using a key, wherein the use of completion port objects allows pending threads to be deactivated whereby execution of tasks related to a given request are suspended until the completion port object receives an associated completion packet at the client side socket that is identified using the associated key;
   a thread pool comprising N threads adapted to process M requests from a client application component, wherein N and M are integers greater than 1 and wherein M is greater than N, wherein any deactivated pending threads are automatically returned to the thread pool and become available for use with other client requests, such that as client requests are received and as pending requests become ready, the next available thread is used to process the client request or previously pending request; and
   a context maintenance module configured to maintain context information for each pending request, such that upon receiving an indication that the pending request has become ready, the next available thread resumes execution at the appropriate state using the context information.

7. The software component of claim 6, further comprising at least one thread activation component that activates at least one of the N threads based on an event.

8. The software component of claim 7, wherein at least one of the N threads deactivates itself and returns to the thread pool when an operation being processed by the at least one of the threads is pending.

9. The software component of claim 7, further comprising a state machine associated with at least one of the M requests.

10. The software component of claim 9, further comprising at least one key associated with the at least one of the M requests, a first one of the N threads is associated with the at least one of the M requests, and the thread activation component associates the context of the first one of the N threads with the at least one state machine using the at least one key, in order to activate the first one of the N threads.

11. The software component of claim 10, wherein the thread activation component associates the context of one of the N threads with the at least one state machine using the at least one key in order to activate the one of the N threads based on an event.

12. The software component of claim 6, further comprising a DNS thread resolves domain names into IP addresses.

13. The software component of claim 6, further comprising a timeout thread with a list of active sockets and timers associated with each socket, and can selectively timeout at least one socket according to at least one timer in the list.

14. A method of implementing a client side HTTP stack, comprising:

receiving a client request at a client side socket, wherein the client side socket is associated with the at least one completion port object using a key, wherein the use of completion port objects allows pending threads to be deactivated whereby execution of tasks related to a given request are suspended until the completion port object receives an associated completion packet at the client side socket that is identified using the associated key;

processing by a processor M requests from a client application component using a thread pool comprising N threads, wherein M and N are integers greater than 1 and M is greater than N, wherein any deactivated pending threads are automatically returned to the thread pool and become available for use with other client requests, such that as client requests are received and as pending requests become ready, the next available thread is used to process the client request or previously pending request; and maintaining context information for each pending request, such that upon receiving an indication that the pending request has become ready, the next available thread resumes execution at the appropriate state using the context information.

15. The method of claim 14, further comprising:
   selectively deactivating at least one of the N threads; and
   activating at least another of the N threads based on an event using at least one thread activation component.

16. The method of claim 15, selectively deactivating at least one of the N threads comprises deactivating the at least one of the N threads when an operation being processed by the at least one of the N threads is pending.

17. The method of claim 16, activating at least another of the N threads based on an event comprises:
   receiving a completion packet using the thread activation component; and
   activating one of the N threads upon receipt of the completion packet using the thread activation component.

18. The method of claim 16, further comprising associating a state machine with at least one of the M requests.

19. The method of claim 18, further comprising:
   associating at least one key with the at least one of the M requests;
   associating a first one of the N threads with the at least one of the M requests; and
   associating a context of the first one of the N threads with the at least one state machine using the at least one key, in order to deactivate the first one of the N threads.

20. The method of claim 19, further comprising associating a context of one of the N threads with the at least one state machine using the at least one key in order to activate the one of the N threads based on an event.

* * * * *